(12) United States Patent
Kodama et al.

(10) Patent No.: US 10,025,369 B2
(45) Date of Patent: Jul. 17, 2018

(54) MANAGEMENT APPARATUS AND METHOD OF CONTROLLING INFORMATION PROCESSING SYSTEM

(71) Applicant: FUJITSU LIMITED, Kawasaki-shi, Kanagawa (JP)

(72) Inventors: Hiroyoshi Kodama, Isehara (JP); Hiroshi Endo, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 78 days.

(21) Appl. No.: 15/370,534

(22) Filed: Dec. 6, 2016

(65) Prior Publication Data
US 2017/0220092 A1 Aug. 3, 2017

(30) Foreign Application Priority Data
Jan. 28, 2016 (JP) .................. 2016-014562

(51) Int. Cl.
*G06F 1/32* (2006.01)

(52) U.S. Cl.
CPC .......... *G06F 1/3234* (2013.01); *G06F 1/3206* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | | |
|---|---|---|---|---|
| 9,880,599 | B1* | 1/2018 | Allen-Ware | G06F 1/266 |
| 2005/0240786 | A1* | 10/2005 | Ranganathan | G06F 1/3215 |
| | | | | 713/320 |
| 2006/0282687 | A1* | 12/2006 | Bahali | G06F 1/3203 |
| | | | | 713/300 |
| 2012/0226918 | A1* | 9/2012 | Rallo | G06F 1/3209 |
| | | | | 713/300 |
| 2013/0145189 | A1* | 6/2013 | Chang | G06F 1/206 |
| | | | | 713/322 |

(Continued)

FOREIGN PATENT DOCUMENTS

| | | |
|---|---|---|
| JP | 2012-165549 | 8/2012 |
| JP | 2013-175120 | 9/2013 |
| WO | WO 2013/042615 A1 | 3/2013 |

*Primary Examiner* — Zahid Choudhury
(74) *Attorney, Agent, or Firm* — Staas & Halsey LLP

(57) ABSTRACT

A management apparatus includes a processor configured to acquire a power consumption value of respective information processing apparatuses divided into groups. The processor is configured to calculate a total power consumption value of the respective groups. The total power consumption value of a group is a sum of the power consumption values of information processing apparatuses belonging to the group. The processor is configured to select a first group having a first total power consumption value which exceeds a first threshold. The processor is configured to select a first information processing apparatus belonging to the first group. The first information processing apparatus has a largest power consumption value among power consumption values of information processing apparatuses belonging to the first group. The processor is configured to move first virtual machines implemented by the first information processing apparatus to a second group among the groups.

11 Claims, 17 Drawing Sheets

(56) References Cited

U.S. PATENT DOCUMENTS

| | | | |
|---|---|---|---|
| 2014/0122910 A1* | 5/2014 | Chiu | G06F 1/3206 713/323 |
| 2014/0208322 A1 | 7/2014 | Sasaki et al. | |
| 2017/0185138 A1* | 6/2017 | Suzuki | G06F 1/266 |

* cited by examiner

FIG. 8

SVTBL

| SERVER NAME | RACK NAME | IN-RACK POSITION | APPARATUS NAME | SERIAL NUMBER | DATE AND TIME OF ACQUISITION | SERVER'S POWER VALUE [W] |
|---|---|---|---|---|---|---|
| ... | ... | ... | ... | ... | ... | ... |
| SV1142 | A11 | U42 | SV200 | MANS0105 | SEPTEMBER 13, 2015 AT 20:12:49 | 244 |
| SV1141 | A11 | U41 | SV200 | AHFP1789 | SEPTEMBER 13, 2015 AT 20:12:50 | 248 |
| SV1140 | A11 | U40 | SV200 | KHTY3678 | SEPTEMBER 13, 2015 AT 20:12:51 | 252 |
| SV1139 | A11 | U39 | SV200 | PODF5439 | SEPTEMBER 13, 2015 AT 20:12:52 | 243 |
| ... | ... | ... | ... | ... | ... | ... |
| SV1242 | A12 | U42 | SV250 | TYGH3218 | SEPTEMBER 13, 2015 AT 20:13:29 | 230 |
| SV1241 | A12 | U41 | SV250 | BDSX1893 | SEPTEMBER 13, 2015 AT 20:13:30 | 244 |
| SV1240 | A12 | U40 | SV250 | POIX2198 | SEPTEMBER 13, 2015 AT 20:13:31 | 238 |
| SV1239 | A12 | U39 | SV250 | TXZP0971 | SEPTEMBER 13, 2015 AT 20:13:32 | 224 |
| ... | ... | ... | ... | ... | ... | ... |

FIG. 9

| RCTBL | | | | | | | |
|---|---|---|---|---|---|---|---|
| SERVER NAME | RACK NAME | IN-RACK POSITION | APPARATUS NAME | SERIAL NUMBER | DATE AND TIME OF ACQUISITION | SERVER'S POWER VALUE [W] | RACK'S POWER VALUE [W] |
| SV1142 | A11 | U42 | SV200 | MANS0105 | SEPTEMBER 13, 2015 AT 20:12:49 | 244 | 5960 |
| SV1141 | A11 | U41 | SV200 | AHFP1789 | SEPTEMBER 13, 2015 AT 20:12:50 | 248 | |
| SV1140 | A11 | U40 | SV200 | KHTY3678 | SEPTEMBER 13, 2015 AT 20:12:51 | 252 | |
| SV1139 | A11 | U39 | SV200 | PODF5439 | SEPTEMBER 13, 2015 AT 20:12:52 | 243 | |
| ... | ... | ... | ... | ... | ... | ... | |
| SV1242 | A12 | U42 | SV250 | TYGH3218 | SEPTEMBER 13, 2015 AT 20:13:29 | 230 | 6000 |
| SV1241 | A12 | U41 | SV250 | BDSX1893 | SEPTEMBER 13, 2015 AT 20:13:30 | 244 | |
| SV1240 | A12 | U40 | SV250 | POIX2198 | SEPTEMBER 13, 2015 AT 20:13:31 | 238 | |
| SV1239 | A12 | U39 | SV250 | TXZP0971 | SEPTEMBER 13, 2015 AT 20:13:32 | 224 | |
| ... | ... | ... | ... | ... | ... | ... | ... |

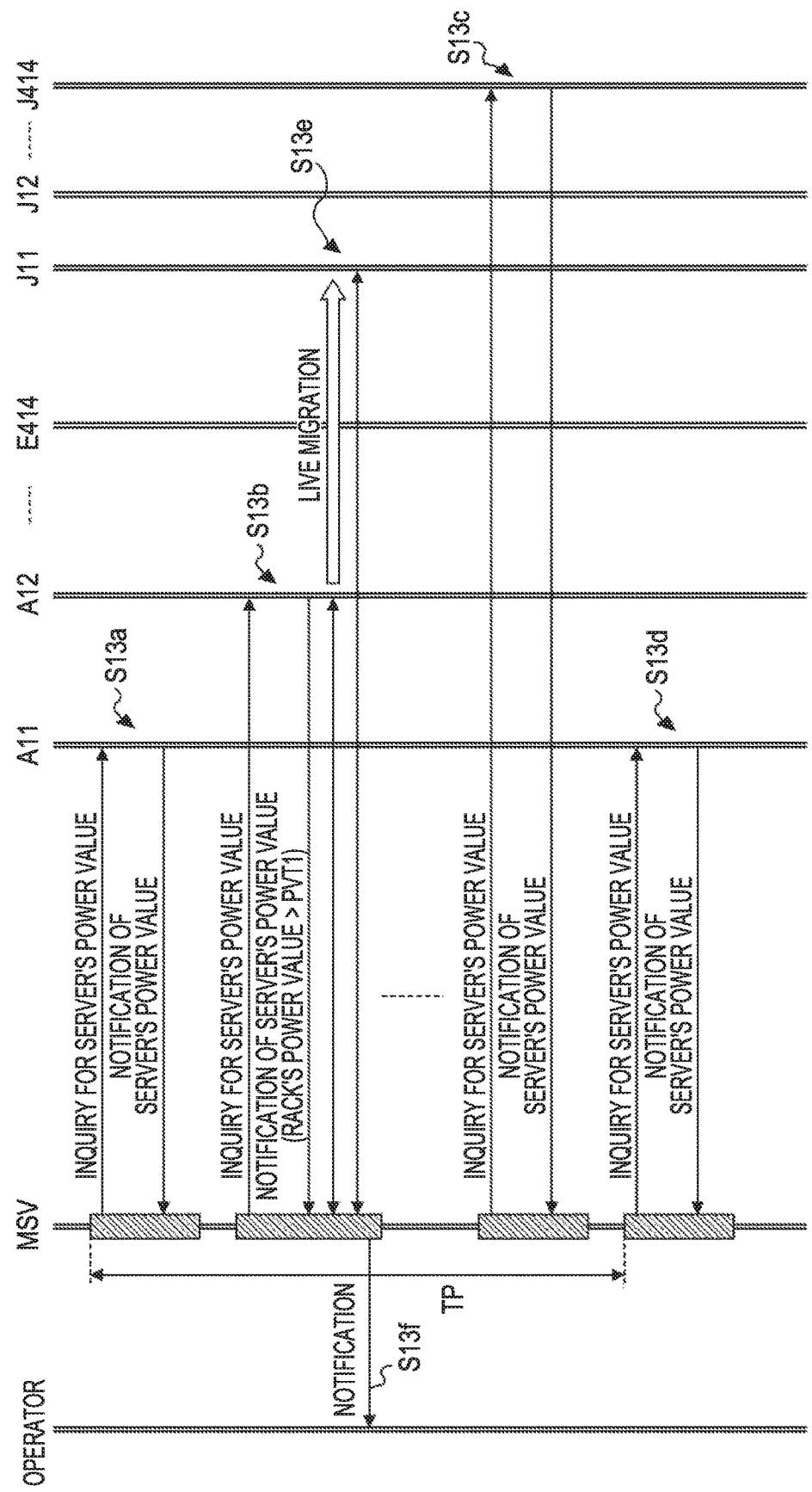

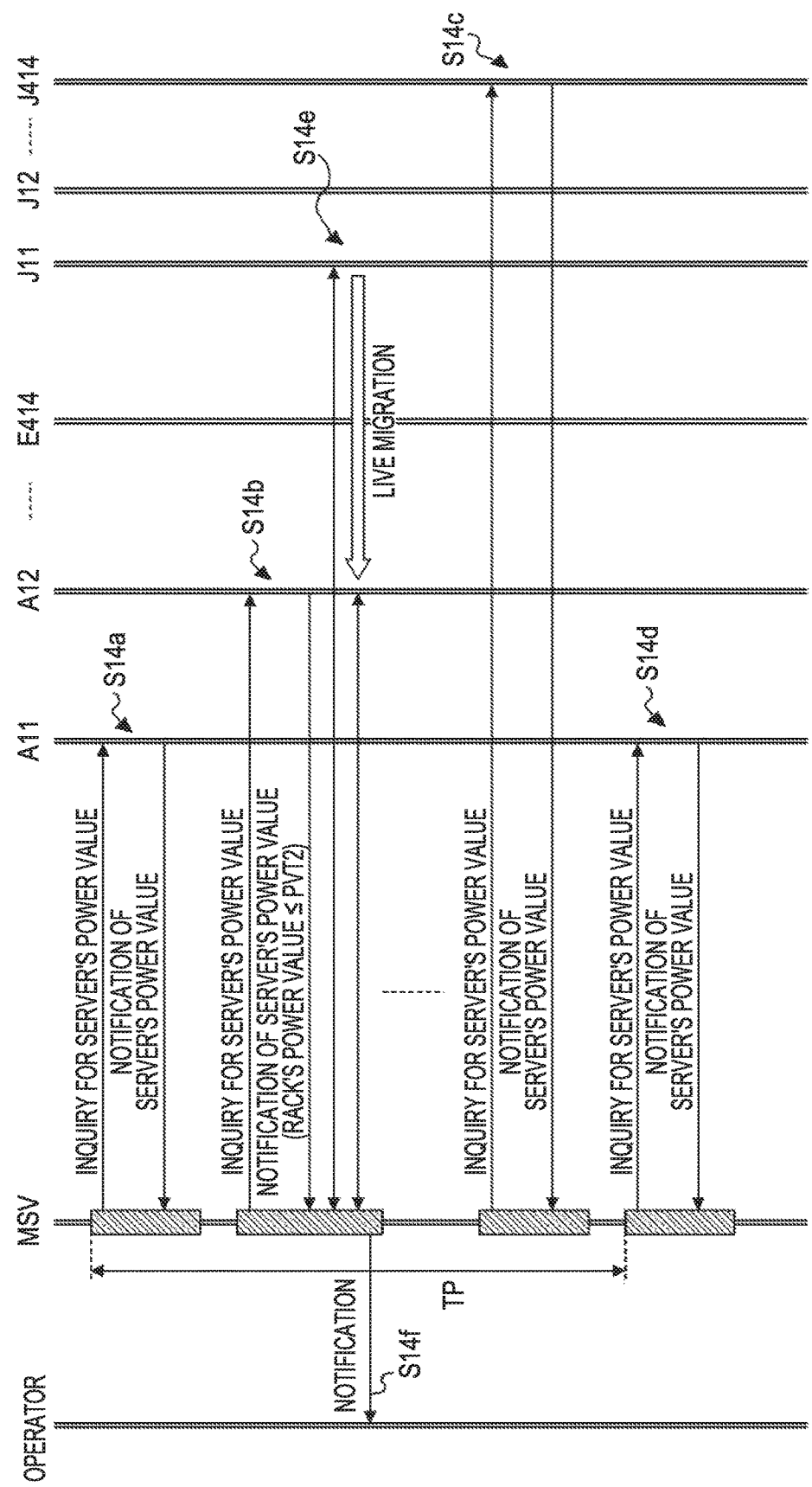

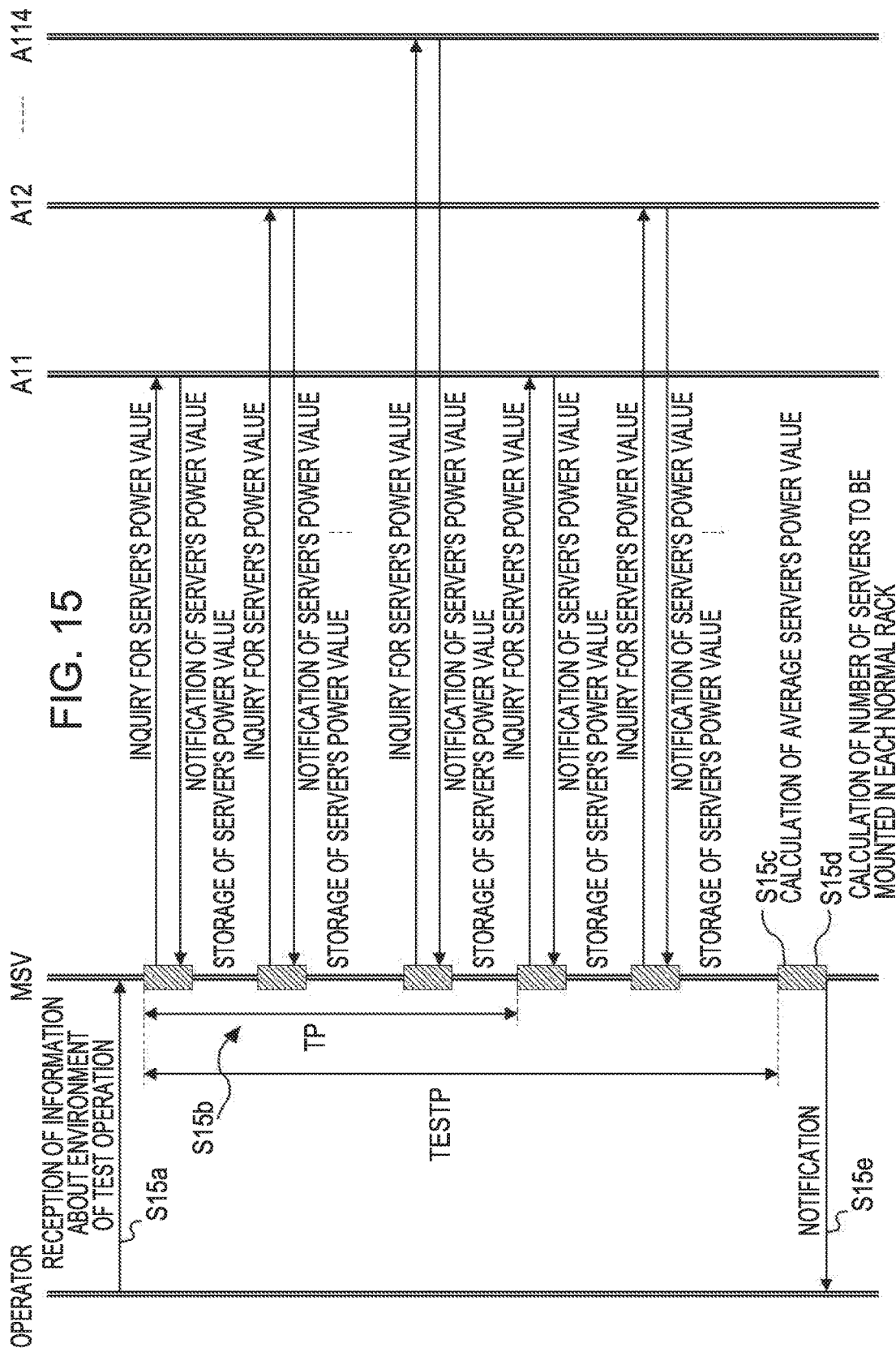

FIG. 16

| | INFORMATION PROCESSING SYSTEM SYS2 ILLUSTRATED IN FIG. 5 | | COMPARATIVE INFORMATION PROCESSING SYSTEM | REMARKS |
|---|---|---|---|---|
| | NORMAL AREAS IAA TO IAE | TEMPORARY AREA IAJ | | |
| NUMBER OF AREAS IA TO BE USED | 5 | 1 | 10 | |
| NUMBER OF RACKS IN EACH AREA IA | 56 | | 56 | |
| NUMBER OF SERVERS IN EACH RACK | 18 | | 10 | |
| TOTAL NUMBER OF SERVERS | 5040 | 1008 | 5600 | |
| AVERAGE POWER CONSUMPTION VALUE OF EACH SERVER (OPERATION RATE) | 240 W (60%) | 108 W (0%) | 240 W (60%) | |
| AVERAGE POWER CONSUMPTION VALUE OF EACH RACK | 4.32 kW | 1.94 kW | 2.4 kW | |
| UPPER LIMIT OF POWER VALUE OF EACH RACK | 4.6 kW | | 4.6 kW | RATED POWER VALUE OF EACH RACK = 4.8 kW |
| RATIO OF POWER VALUE USED BY EACH RACK | 94% | 42% | 52% | RATIO TO UPPER LIMIT OF POWER VALUE OF RACK |
| POWER CONSUMPTION VALUE IN EACH AREA IA | 241.9 kW | 108.9 kW | 134.4 kW | |
| POWER CONSUMPTION VALUE OF ALL SERVERS | ⌐1318 kW | | ⌐1344 kW | |
| OPERATION RATE OF AIR CONDITIONER | 63% | 28% | 35% | RATED POWER VALUE OF EACH AIR CONDITIONER = 96 kW |
| COP | 4.2 | 2.8 | 3.2 | OUTSIDE AIR TEMPERATURE: 20°C |
| POWER CONSUMPTION VALUE OF EACH AIR CONDITIONER | 14.4 kW | 9.6 kW | 10.5 kW | |
| TOTAL POWER VALUE OF ALL AIR CONDITIONERS | ⌐326 kW | | ⌐420 kW | 94 kW (22.3%) REDUCTION |
| TOTAL POWER VALUE | →1644 kW | | →1764 kW | 120 kW (6.8%) REDUCTION |

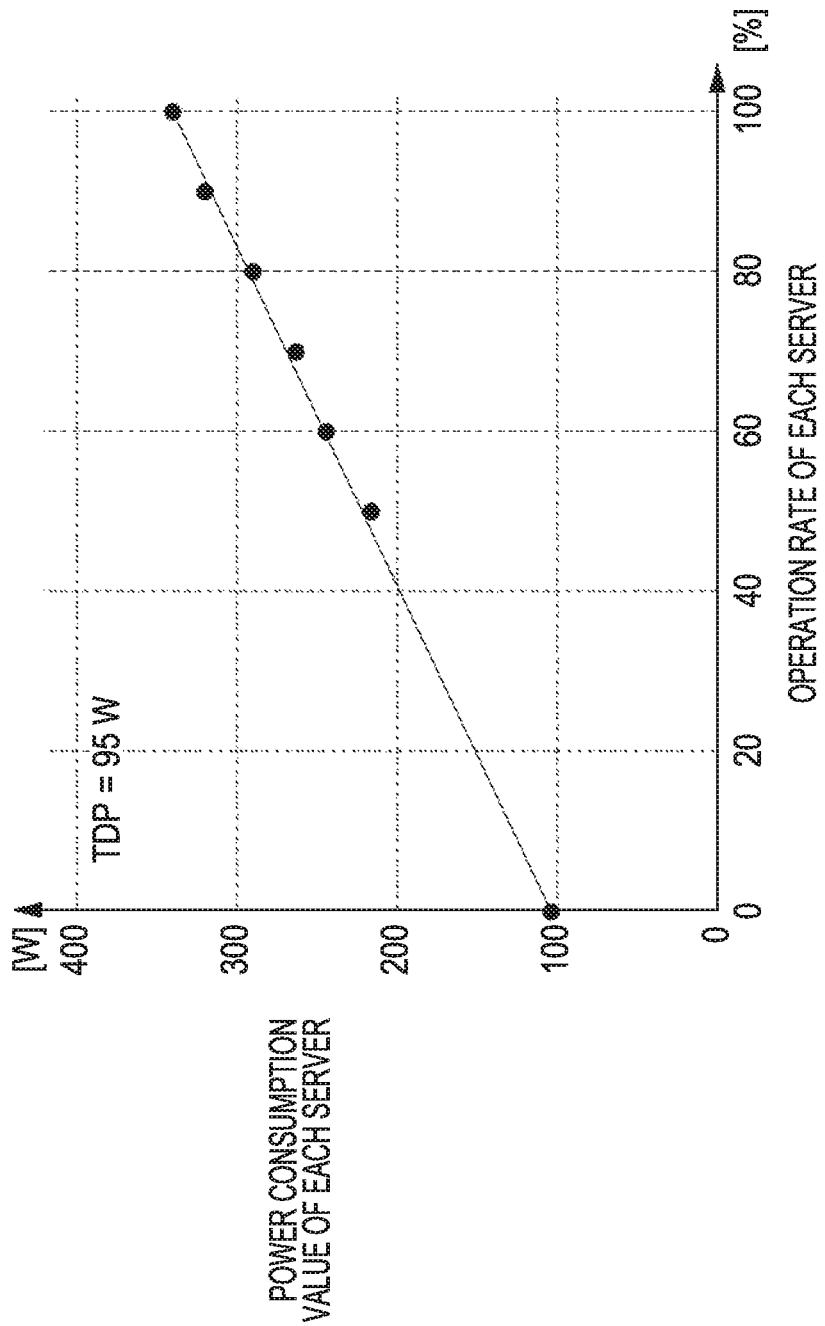

MANAGEMENT APPARATUS AND METHOD OF CONTROLLING INFORMATION PROCESSING SYSTEM

CROSS-REFERENCE TO RELATED APPLICATION

This application is based upon and claims the benefit of priority of the prior Japanese Patent Application No. 2016-014562, filed on Jan. 28, 2016, the entire contents of which are incorporated herein by reference.

FIELD

The embodiments discussed herein are related to a management apparatus and a method of controlling an information processing system.

BACKGROUND

In an information processing system that includes a plurality of information processing apparatuses such as servers, power consumption values are managed for each information processing apparatus or each rack in which information processing apparatuses are mounted, to keep the total power consumption value of the information processing apparatuses from exceeding a limit. For example, each of a plurality of servers calculates the total power consumption value of the plurality of servers on the basis of information about power consumption values transferred among the servers, and when the total power consumption value exceeds a threshold, switches to an operation state in which power consumption is suppressed. In another example, when assigning virtual machines to a plurality of servers, a control apparatus controls the assignment of the virtual machines to the servers in accordance with a solution to an integer linear programming problem that minimizes a power consumption value for each rack in which servers are mounted. In some data centers, a power consumption value is calculated for each rack in which a plurality of information technology (IT) devices are mounted. When the calculated power consumption value exceeds a supposed value by a predetermined threshold or more, an alarm is output.

Related techniques are disclosed in, for example, Japanese Laid-open Patent Publication No. 2012-165549, International Publication Pamphlet No. WO 2013/042615, and Japanese Laid-open Patent Publication No. 2013-175120.

To keep a power consumption value from exceeding a limit value for a rack in which servers are mounted, the number of servers to be mounted in the rack is determined by, for example, multiplying the maximum value of electric power supplied to the rack by a safety factor and then dividing the resulting product by the power consumption value of a server operating at an operation rate of 100%. Although it is less likely that all servers placed in an information processing system of a data center operate at an operation rate of 100%, the number of servers to be mounted in a rack is set with a margin so that the information processing system is safely operated. For example, assuming that the rated value of electric power supplied to a rack is 4.8 kW, the safety factor is 85%, and the power consumption value of a server operating at an operation rate of 100% is 340 W, the number of servers to be mounted in the rack is set to "12". If the average operation rate of servers during the operation of an information processing system is 70%, then the total power consumption value (2.86 kW) of the servers mounted in the rack is 60% of the rated value of electric power supplied to the rack. In this case, about 2 kW of 4.8 kW that may be supplied to the rack is not consumed and does not make a contribution to improvement of the performance of the information processing system.

SUMMARY

According to an aspect of the present invention, provided is a management apparatus including a memory and a processor coupled to the memory. The processor is configured to acquire a power consumption value of respective information processing apparatuses divided into groups. The power consumption value is a value of electric power consumed by the respective information processing apparatuses. The processor is configured to calculate a total power consumption value of the respective groups. The total power consumption value of a group is a sum of the power consumption values of information processing apparatuses belonging to the group. The processor is configured to select a first group from among the groups. The first group has a first total power consumption value which exceeds a first threshold. The processor is configured to select a first information processing apparatus belonging to the first group. The first information processing apparatus has a largest power consumption value among power consumption values of information processing apparatuses belonging to the first group. The processor is configured to move first virtual machines implemented by the first information processing apparatus to a second group among the groups. The second group is different from the first group.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of a server management table illustrated in FIG. 7;

FIG. 9 is a diagram illustrating an example of a rack management table illustrated in FIG. 7;

FIG. 13 is a diagram illustrating an example of processing of the information processing system illustrated in FIG. 5;

FIG. 14 is a diagram illustrating an example of processing of the information processing system illustrated in FIG. 5;

FIG. 15 is a diagram illustrating an example of processing during a test operation of the information processing system illustrated in FIG. 5;

FIG. 16 is a diagram illustrating an example of power consumption values in the information processing system illustrated in FIG. 5;

FIG. 17 is a diagram illustrating an example of a relationship between a power consumption value of each server installed in the installation location illustrated in FIG. 6 and an operation rate of the server.

DESCRIPTION OF EMBODIMENTS

Embodiments will be described below with reference to the drawings.

First Embodiment

Figure 1:
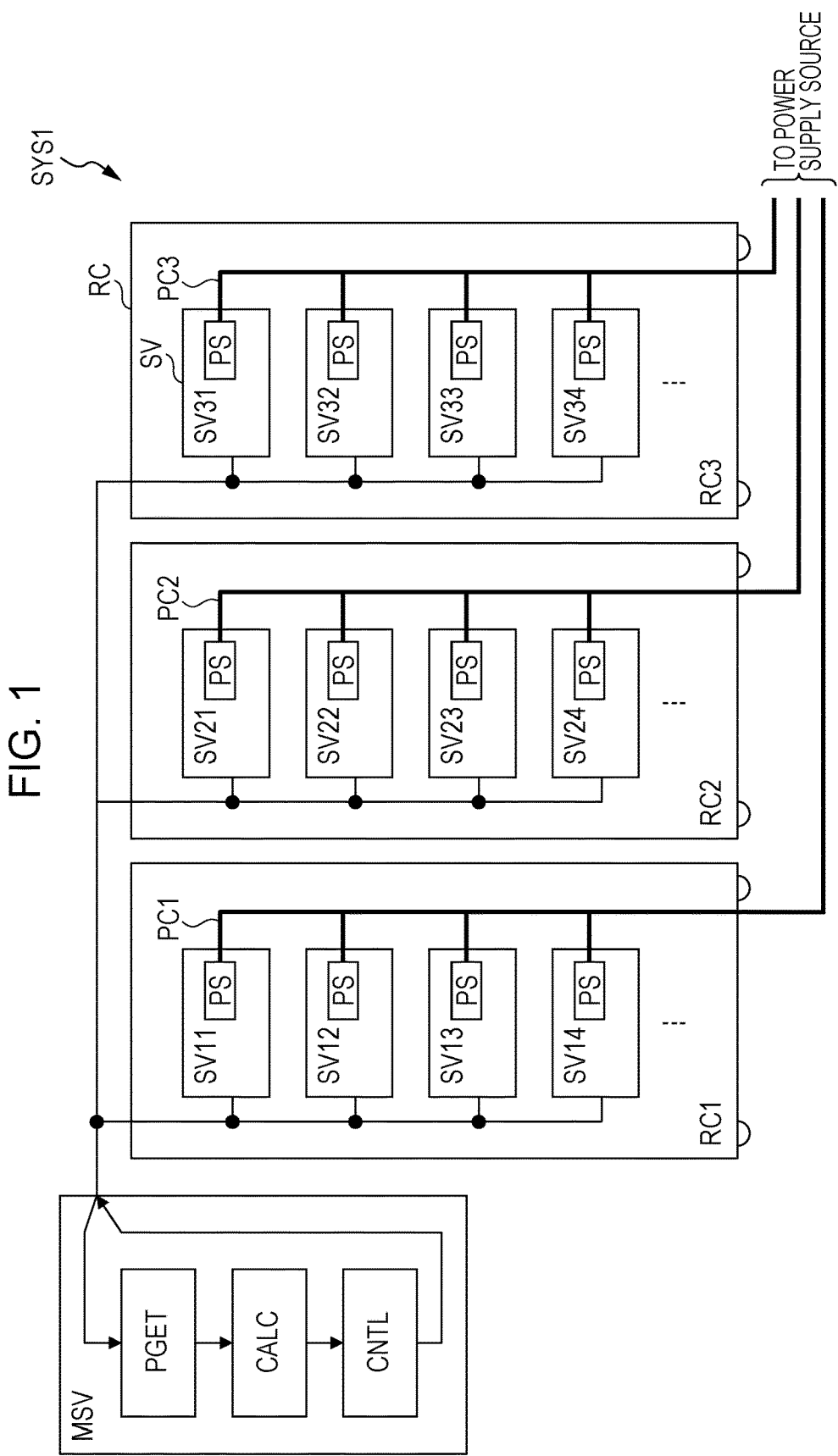
FIG. 1 is a diagram illustrating an exemplary configuration of an information processing system according to a first embodiment.

FIG. 1 illustrates an exemplary configuration of an information processing system SYS1 according to a first embodiment. The information processing system SYS1 illustrated in FIG. 1 includes a plurality of racks RC (having rack names RC1, RC2, and RC3, respectively) and a management server (denoted by MSV in FIG. 1). Each rack RC is an example of a housing. Although three racks RC are included in the information processing system SYS1 in FIG. 1, the number of racks RC is not limited to "3".

Figure 2:
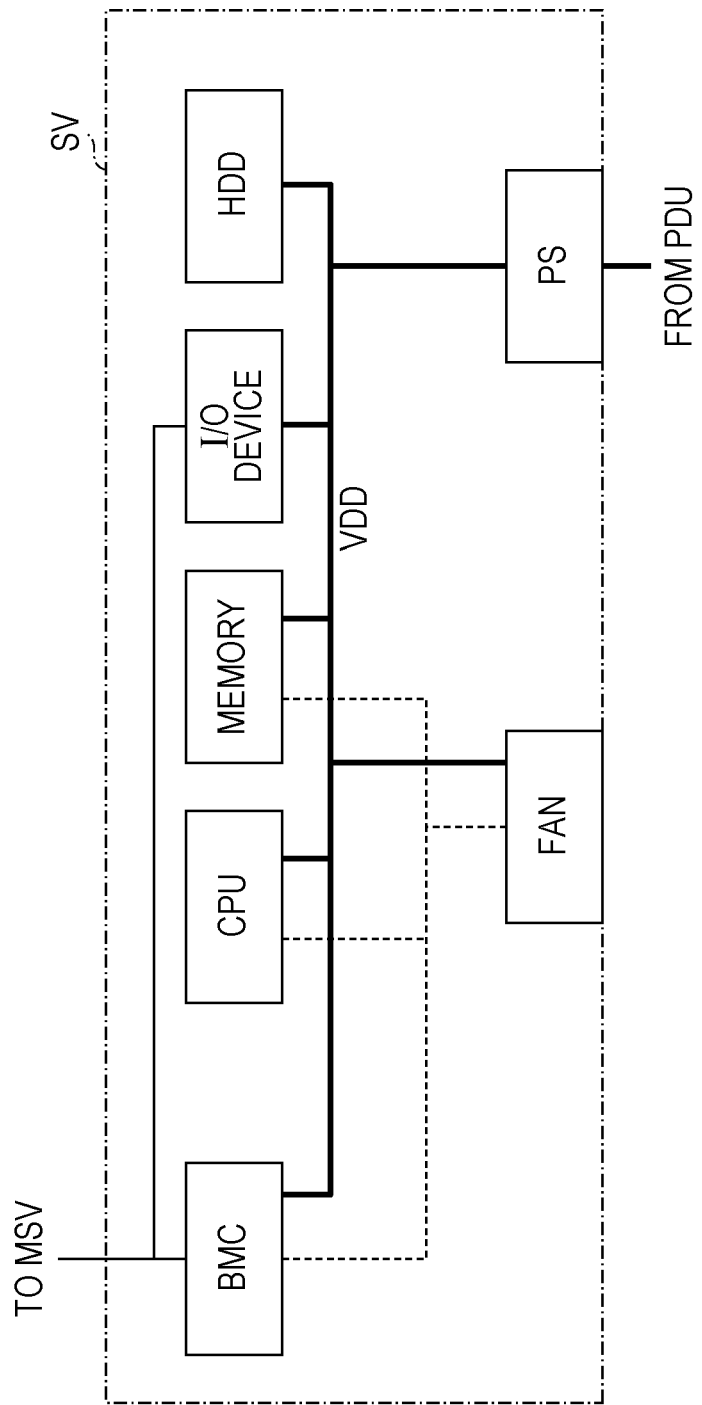
FIG. 2 is a diagram illustrating an exemplary hardware configuration of a server illustrated in FIG. 1.

The rack RC1 has a space in which a plurality of servers SV (having server names SV11, SV12, SV13, SV14, . . . ) are mounted. The rack RC2 has a space in which a plurality of servers SV (having server names SV21, SV22, SV23, SV24, . . . ) are mounted. The rack RC3 has a space in which a plurality of servers SV (having server names SV31, SV32, SV33, SV34, . . . ) are mounted. Each server SV is an example of an information processing apparatus. An exemplary hardware configuration of the server SV is illustrated in FIG. 2.

The racks RC1, RC2, and RC3 receive electric power from a power supply source through power cables PC (PC1, PC2, and PC3), respectively. The maximum value of electric power that may be supplied to each rack RC is set for each power cable PC. Each server SV in each rack RC has a power supply unit (PS), which generates a power supply voltage used in the server SV, from electric power received from the power supply source.

The information processing system SYS1 is used in, for example, a cloud computing service, which provides computer resources through a network. In FIG. 1, each server SV mounted in the racks RC1 and RC2 activates at least one virtual server and uses the virtual server to execute data processing and the like. The virtual server is an example of a virtual machine implemented by the server SV. Each of the racks RC1 and RC2 is an example of a processing group that includes a plurality of servers SV that use virtual machines to start information processing.

Servers SV mounted in the rack RC3 are used as destinations to which virtual servers implemented by servers SV mounted in the rack RC1 or RC2 are moved. The rack RC3 is an example of a move destination group that includes servers SV to which virtual machines are moved from servers SV in the processing groups. Since the servers SV mounted in the rack RC3 are used only as destinations to which virtual servers are moved, the management server MSV may easily control the movement of virtual servers when compared with a case in which destinations to which virtual servers are moved are not predetermined. The information processing system SYS1, which causes the servers SV mounted in the racks RC1 and RC2 to implement virtual servers, may be used for purposes other than a cloud computing service.

Virtual servers are moved from the rack RC1 or RC2 to the rack RC3 when the value of electric power consumed in each of the racks RC1 and RC2, to each of which a single common power cable PC is coupled, exceeds a predetermined threshold, which is a threshold PVT1 described later with reference to FIG. 4. Therefore, the management server MSV may control the movement of virtual servers from the rack RC1 or RC2 to the rack RC3, on the basis of the rated power values of breakers or the like to which the power cables PC are coupled and the values of electric power consumed in the racks RC1 and RC2. As a result, the management server MSV may easily control the movement of virtual servers when compared with a case in which virtual servers are moved for each group to which a common power cable PC is not coupled.

In the description below, a process to move virtual servers implemented by a server SV to a server SV in another rack RC will be referred to as a live migration. In the description below, the racks RC1 and RC2 that include servers SV that use virtual servers to start information processing will also be referred to as normal racks RC. The rack RC3, which is another rack that includes servers SV to which virtual servers are moved from servers SV in a normal rack RC through a live migration, will also be referred to as a temporary rack RC3.

The management server MSV includes an acquisition unit (denoted by PGET in FIG. 1), a calculation unit (denoted by CALC in FIG. 1), and a control unit (denoted by CNTL in FIG. 1). The management server MSV and the servers SV are mutually coupled through a network such as a local area network (LAN) or the like. The management server MSV has a hardware configuration similar to that of the server SV illustrated in FIG. 2, but this is not a limitation. The acquisition unit PGET, calculation unit CALC, and control unit CNTL may be implemented by a control program executed by the management server MSV or may be implemented by hardware of the management server MSV. For example, the functions of the acquisition unit PGET, calculation unit CALC, and control unit CNTL are implemented by causing a central processing unit (CPU) in the management server MSV to execute a control program stored in a memory. The management server MSV is an example of a management apparatus that manages a plurality of servers SV.

The acquisition unit PGET acquires, from each of the plurality of servers SV, a power consumption value of the server SV through the network. For each group of the servers SV coupled to a common power cable PC, the calculation unit CALC calculates a total power consumption value, which is the total of the power consumption values of all servers SV in the group. In the example illustrated in FIG. 1, one power cable PC is coupled for each rack RC, so each group includes servers mounted in one rack RC. When a single power cable is coupled to a pair of racks RC in common, each group includes servers SV mounted in the pair of racks RC.

Figure 3:
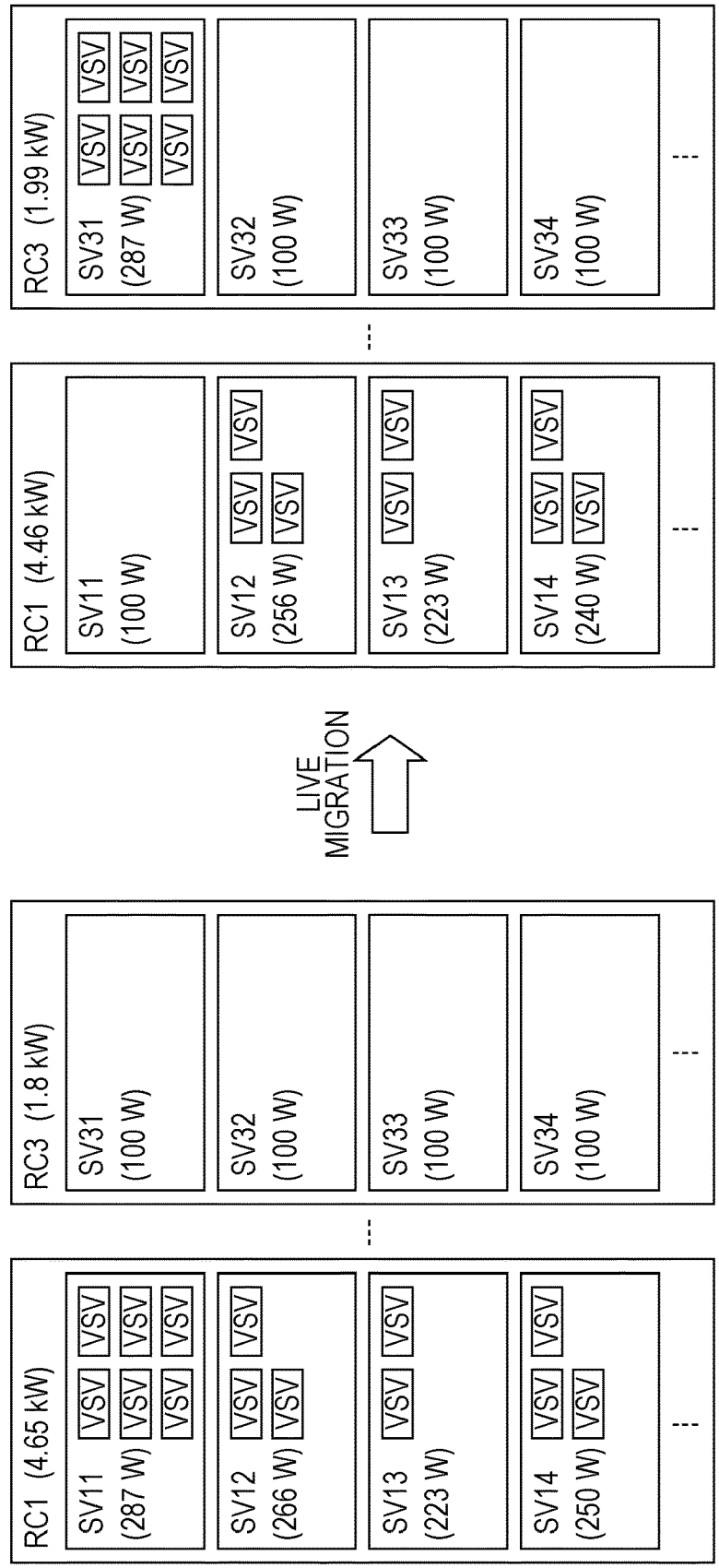
FIG. 3 is a diagram illustrating an example of a live migration in the information processing system illustrated in FIG. 1.

The control unit CNTL determines whether there is an excessively power-consuming rack, in which its total power consumption value exceeds a predetermined threshold, in the plurality of normal racks RC1 and RC2. When there is an excessively power-consuming rack, the control unit CNTL executes a live migration to move, to the temporary rack RC3, virtual servers implemented by the server SV that has the largest power consumption value in the excessively power-consuming rack. An example of a live migration is illustrated in FIG. 3, and an example of processing of the management server MSV is illustrated in FIG. 4.

FIG. 2 illustrates an exemplary hardware configuration of a server SV illustrated in FIG. 1. Each bold solid line in FIG. 2 indicates a power cable. The server SV includes a baseboard management controller (BMC), a processor such as a CPU, a memory, and an input/output (I/O) device. The server SV also includes a hard disk drive (HDD), a power supply unit (PS), and a fan. The BMC, CPU, memory, I/O device, HDD, and fan operate by a power supply voltage VDD. For example, the BMC in the management server MSV and the server SV are designed so as to conform to the intelligent platform management interface (IPMI), so they transmit and receive information in accordance with the IPMI specifications.

The BMC manages operation states of the CPU, memory, and fan, which are mutually coupled with broken lines, in response to instructions received from the management server MSV illustrated in FIG. 1. For example, the BMC instructs the CPU to change its clock frequency, detects an error in data stored in the memory, and instructs the fan to change its rotational speed. The BMC may operate by a power supply voltage provided by a system different from the power supply voltage VDD.

The CPU implements the functions of the server SV by executing a program stored in the memory. The memory is, for example, a memory module that includes a plurality of dynamic random access memory (DRAM) chips and the like. The I/O device is, for example, a LAN card inserted into a slot conforming to the Peripheral Component Interconnect (PCI) standard. The HDD holds programs to be transferred to the memory at the start of the server SV as well as data to be processed by the CPU. The server SV may include a solid state drive (SSD) instead of the HDD. The fan is attached to the intake port or an exhaust port of the server SV so that outside air is inhaled into the server SV and heat generated by the CPU and other electronic parts is exhausted to the outside of the server SV.

The power supply unit PS includes, for example, an alternating current (AC)/direct current (DC) converter. The power supply unit PS converts an AC voltage supplied from the power supply source to a DC voltage and outputs the converted DC voltage to the CPU and the like as the power supply voltage VDD.

FIG. 3 illustrates an example of a live migration in the information processing system SYS1 illustrated in FIG. 1. In FIG. 3, the normal rack RC1 and temporary rack RC3 are illustrated. In each of the racks RC1 and RC3, 18 servers SV are mounted. In FIG. 3, watts (such as, for example, 287 W) indicated in parentheses in each server SV is an example of the power consumption value of the server SV. Kilowatts (such as, for example, 4.65 kW) indicated in parentheses to the right of the rack name of each rack RC indicates the total of the power consumption values (total power consumption value) of the servers SV mounted in the rack RC. The power consumption value of each server SV may be acquired when the acquisition unit PGET illustrated in FIG. 1 asks the server SV through a network. The total power consumption value of each rack RC is calculated by the calculation unit CALC in FIG. 1. The acquisition of a power consumption value and the calculation of the total power consumption value are each executed at intervals of a predetermined time (30 seconds, for example).

In FIG. 3, each server SV in the rack RC1 implements a plurality of virtual servers (denoted by VSV in FIG. 3), and the total power consumption value (4.65 kW) of the rack RC1 is higher than a predetermined threshold, 4.6 kW. For example, the predetermined threshold is set to 96% of 4.8 kW, which is the maximum value of electric power (rated power value) that may be supplied to each rack RC. The predetermined threshold is determined on the basis of an empirical rule such as a relationship between an execution period of a live migration and the amount of increase per hour in the total power consumption value. Alternatively, the predetermined threshold is determined on the basis of, for example, a relationship between a time from when the total power consumption value exceeds the rated power value until when a breaker (BRK) through which electric power is supplied to the rack RC is shut down and the amount of increase per hour in the total power consumption value. Each server SV in the rack RC3 does not implement a virtual server VSV and its power consumption value is 100 W, so the total power consumption value of the rack RC3 is 1.8 kW.

When the total power consumption value of the rack RC1 exceeds the predetermined threshold, the control unit CNTL in the management server MSV illustrated in FIG. 1 selects the server SV11 that has the largest power consumption value among the servers SV in the rack RC1. The control unit CNTL executes a live migration so that the virtual servers VSV implemented by the selected server SV11 are moved to any one of the servers SV in the rack RC3. In the example illustrated in FIG. 3, the control unit CNTL moves the virtual servers VSV implemented by the selected server SV11 to the server SV31 in the rack RC3.

After the execution of the live migration, the power consumption of the server SV11 falls to 100 W and the power consumption of the server SV31 becomes 287 W. As a result, the total power consumption value of the rack RC1 falls to 4.46 kW, which is lower than the predetermined threshold, and the total power consumption value of the rack RC3 becomes 1.99 kW. Therefore, it is possible to lower the possibility that the total power consumption value of the rack RC1 exceeds the rated power value and improve the reliability of the information processing system SYS1, when compared with a case before the live migration is executed.

When a plurality of servers SV in the rack RC1 have the largest power consumption value, the control unit CNTL may select the plurality of servers SV having the largest power consumption value or may select any one of the plurality of servers SV having the largest power consumption value. The control unit CNTL then executes a live migration so that the virtual servers VSV implemented by each of the selected server or servers SV are moved to any one of the servers SV in the rack RC3.

When it is assumed that the total power consumption value of the rack RC1 is 4.85 kW, then even after the virtual servers VSV implemented by the server SV11 are moved to the servers SV31, the total power consumption value of the rack RC1 is 4.66 kW, which is still higher than the predetermined threshold. In this case, the control unit CNTL moves the virtual servers VSV implemented by the server SV12, which has the second largest power consumption value to any one of the servers SV in the rack RC3. Thus, the total power consumption value of the rack RC1 falls to 4.50 kW, which is lower than the predetermined threshold, and the total power consumption value of the rack RC3 becomes 2.15 kW.

When the server SV having the largest power consumption value is selected, the effect of reducing the total power consumption value of the rack RC1 may be made to be larger than when a server SV other than the server SV having the largest power consumption value is selected. As a result, it is possible to minimize the number of servers SV for which live migrations are executed (that is, to minimize the number of live migrations) and thereby minimize an increase in the load of the information processing system SYS1 due to live migrations.

As described above, when a live migration is executed depending on the total power consumption value of each normal rack RC, it is possible to keep the total power consumption value of the rack RC1 from exceeding the rated power value while the performance of the information processing system SYS1 is maintained.

In a conventional practice, for example, the number of servers SV to be mounted in each rack RC is determined so that the total of the rated power values of the servers SV to be mounted in the rack RC does not exceed the maximum value (rated power value) of electric power that may be supplied to the rack RC. On the other hand, according to the information processing system SYS1, the virtual servers VSV implemented by servers SV in a normal rack RC may be moved to the outside of the normal rack RC. According to the information processing system SYS1, therefore, the total of the rated power values of the servers SV to be mounted in a normal rack RC may be set to a value larger than the rated power value of the normal rack RC. When, for example, the rated power value of each rack RC is 4.8 kW, the number of servers SV to be mounted in each rack RC is determined so that the total of the rated power values of the servers SV to be mounted in each rack RC becomes 1.5 times (7.2 kW) the rated power value of a power supply tap (PDU: power distribution unit). In this case, the number of servers SV to be mounted in each rack RC may be increased by a factor of 1.5 when compared with the conventional practice.

As described above, when the virtual servers VSV implemented by a server SV in a normal rack RC are moved to the temporary rack RC3, more servers SV than in the conventional practice may be mounted in each normal rack RC. Therefore, it is possible to increase the mounting density of servers SV in the information processing system SYS1 and thereby improve the performance of the information processing system SYS1 when compared with the conventional practice.

Figure 4:
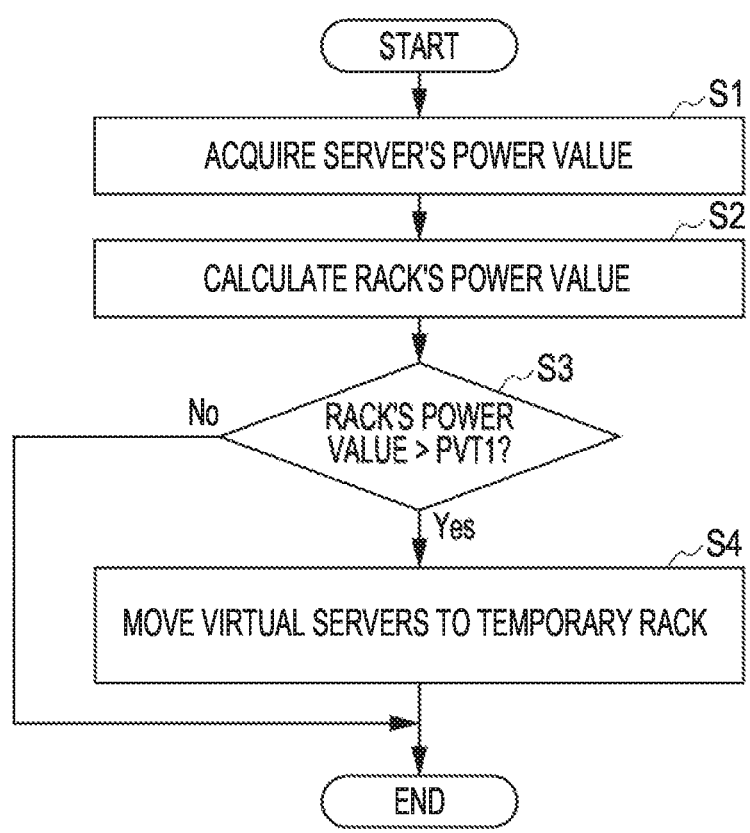
FIG. 4 is a flowchart illustrating an example of processing of a management server illustrated in FIG. 1.

FIG. 4 illustrates an example of processing of the management server MSV illustrated in FIG. 1. The processing illustrated in FIG. 4 is implemented by a control program executed by the management server MSV. The processing is repeated at a predetermined interval (30 seconds, for example) for each normal rack RC. That is, FIG. 4 illustrates an example of a flow of a method of controlling an information processing system and a processing flow of a control program executed by the management apparatus. The control program is stored in the memory in the management server MSV and is executed by a processor such as the CPU mounted in the management server MSV.

First, in S1, the acquisition unit PGET in the management server MSV acquires a power consumption value from each server SV mounted in each rack RC. In the description below, the power consumption value of each server SV will also be referred to as a server's power value. Next, in S2, the calculation unit CALC in the management server MSV calculates the total power consumption value of the normal rack RC on the basis of the server's power values acquired in S1. In the description below, the total power consumption value of a normal rack RC will also be referred to as a rack's power value.

Next, in S3, the control unit CNTL in the management server MSV determines whether the rack's power value exceeds the threshold PVT1. That is, the control unit CNTL determines whether to execute a live migration. When the rack's power value exceeds the threshold PVT1, the control unit CNTL proceeds to S4. When the rack's power value is lower than or equal to the threshold PVT1, the control unit CNTL terminates the processing.

In S4, the control unit CNTL in the management server MSV selects, from the servers SV mounted in the normal rack RC in which the rack's power value exceeds the threshold PVT1, a server SV that has the largest power consumption value. The control unit CNTL then moves virtual servers VSV implemented by the selected server SV to any one of the servers SV in the temporary rack RC3 and terminates the processing. For example, a server SV to which the virtual servers VSV are to be moved is selected from servers SV that are not implementing virtual servers VSV, among the servers SV mounted in the temporary rack RC3.

According to the first embodiment described above with reference to FIGS. 1 to 4, when virtual servers VSV are moved from a normal rack RC to the temporary rack RC3, it is possible to keep the rack's power value from exceeding the rated power value of the normal rack RC. Therefore, for example, the total rated power value of the servers SV to be mounted in a normal rack RC may be set to a value larger than the rated power value of the normal rack RC. As a result, it is possible to increase the number of servers SV to be mounted in each normal rack RC when compared with a conventional practice and thereby improve the performance of the information processing system SYS1. Since it is possible to keep the rack's power value from exceeding the rated power value of a normal rack RC, the reliability of the information processing system SYS1 may be improved.

When a live migration is executed, the server SV having the largest power consumption value is selected from a normal rack RC, so the effect of reducing the total power consumption value of the normal rack RC may be made to be larger than when a server SV other than the server SV having the largest power consumption value is selected. As a result, it is possible to minimize the number of live migrations executed to lower the total power consumption value of the normal rack RC to a value lower than or equal to the threshold PVT1 and thereby minimize an increase in the load of the information processing system SYS1 through live migrations.

The management server MSV moves virtual servers VSV implemented by servers SV to the temporary rack RC3, for each of the racks RC to which a common power cable PC, which supplies electric power, is coupled. Thus, the movement of virtual servers VSV may be easily controlled when compared with a case in which virtual servers VSV are moved for each of groups to which the common power cable PC is not coupled. Since the servers SV mounted in the rack RC3 are used only as destinations to which virtual servers VSV are moved, the management server MSV may easily control the movement of the virtual servers VSV when compared with a case in which destinations to which virtual servers VSV are moved are not predetermined.

Second Embodiment

Figure 5:
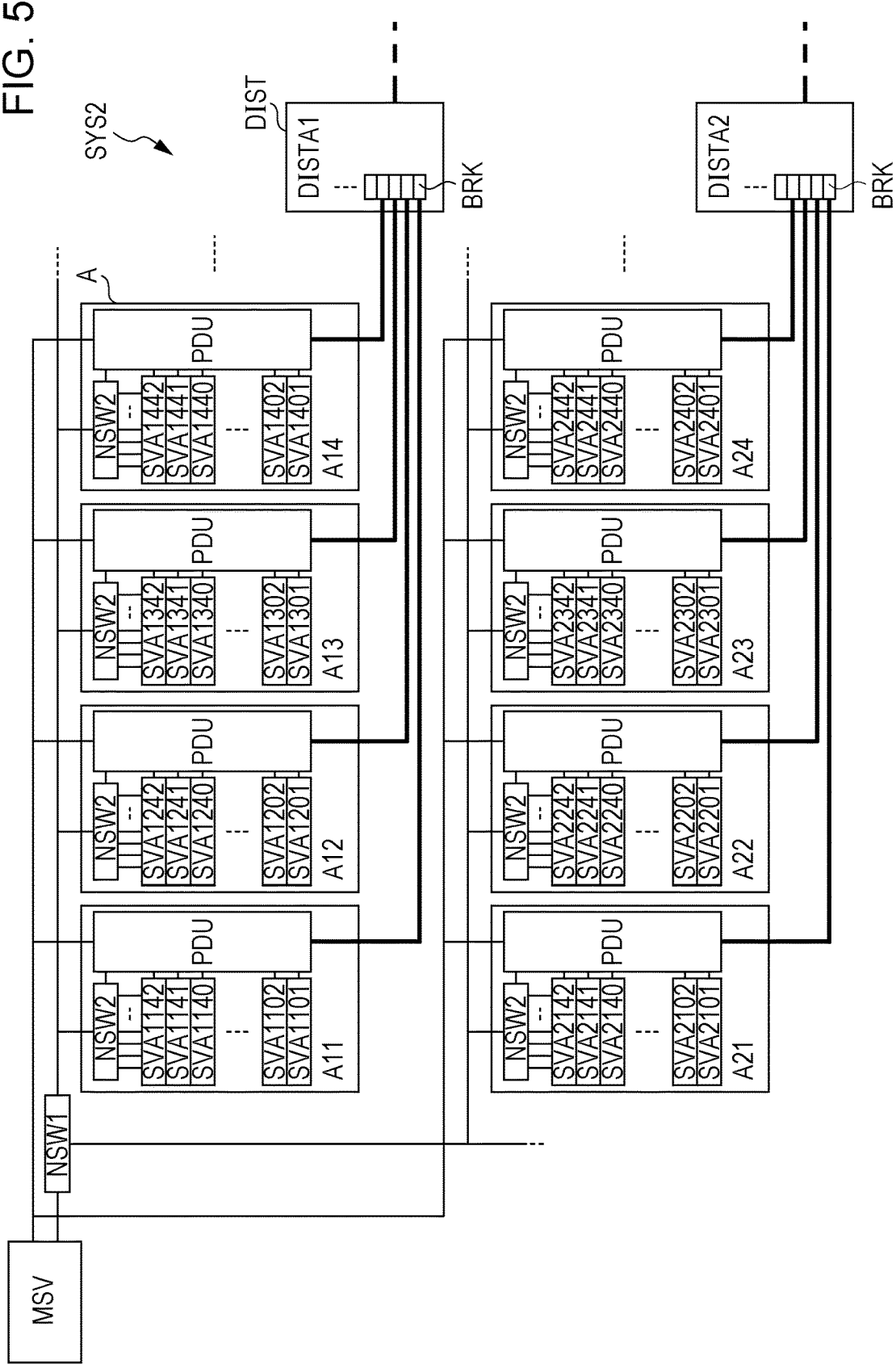
FIG. 5 is a diagram illustrating an exemplary configuration of an information processing system according to a second embodiment.

FIG. 5 illustrates an exemplary configuration of an information processing system SYS2 according to a second embodiment. Elements that are similar to elements described in the first embodiment with reference to FIG. 1 will be assigned similar reference characters and names and their detailed explanation will be omitted.

The information processing system SYS2 illustrated in FIG. 5 includes a plurality of racks A (having rack names A11, A12, A13, A14, . . . , A21, A22, A23, A24, . . . ), distribution boards DIST (having distribution board names DISTA1 and DISTA2), a management server MSV, and a first network switch (denoted by NSW1 in FIG. 5). The information processing system SYS2 is used in a cloud computing service or the like as with the information processing system SYS1 illustrated in FIG. 1.

The racks A11, A12, A13, and A14 receive electric power through their respective breakers BRK provided in the distribution board DISTA1. Similarly, the racks A21, A22, A23, and A24 receive electric power through their respective breakers BRK provided in the distribution board DISTA2. The distribution boards DISTA1 and DISTA2 are provided for each predetermined number of racks A. Processing of live migration is executed for each rack A that receives electric power through a common power supply cable (that is, for each breaker BRK), as will be described later with reference to FIGS. 10 and 11. When a common power supply cable coupled to one breaker BRK is coupled to a pair of racks A, processing of live migration may be executed for each pair of racks A. Thus, the movement of virtual servers may be easily controlled when compared with a case in which a live migration is executed for each pair of racks A to which a common power supply cable is not coupled.

Figure 6:
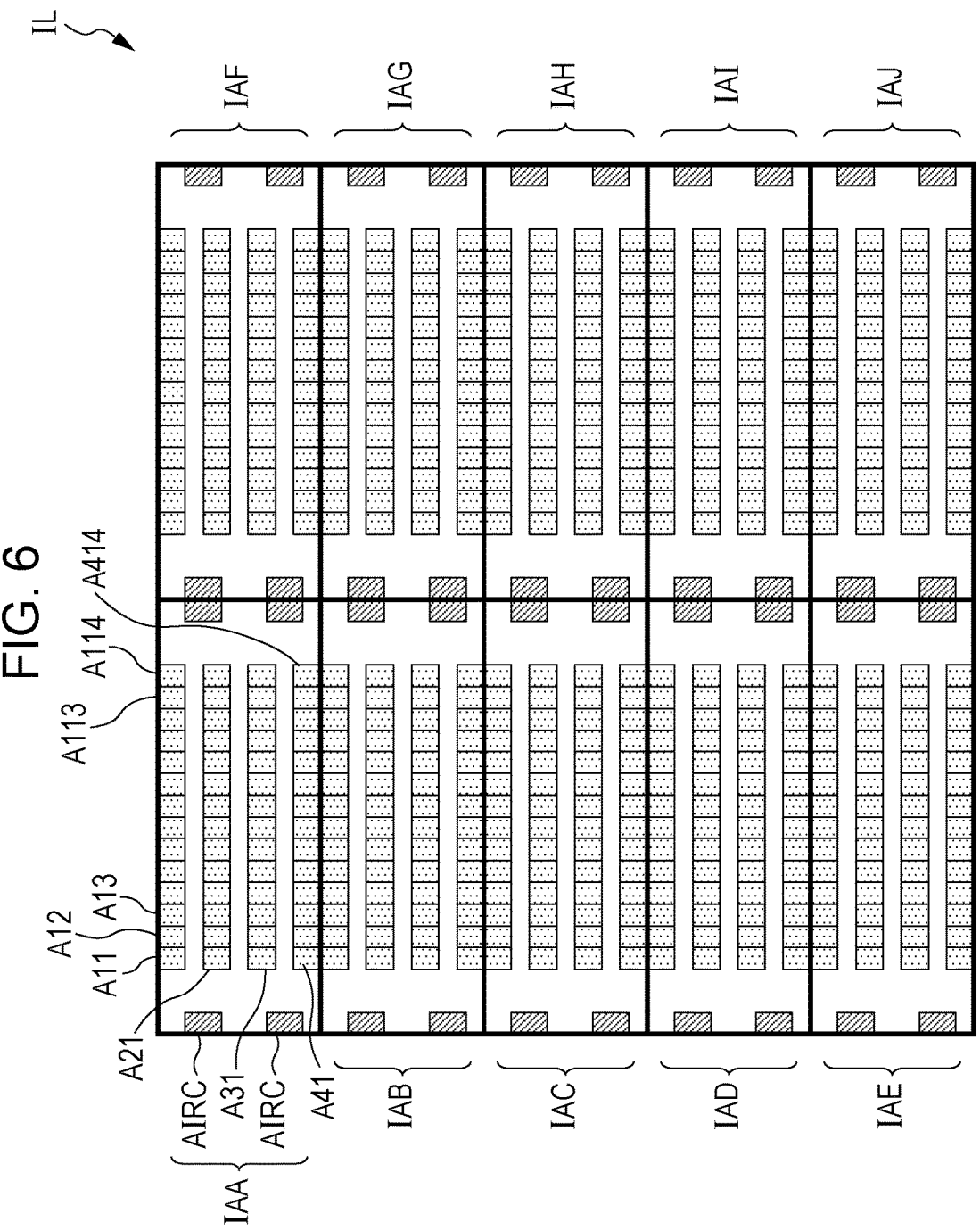
FIG. 6 is a diagram illustrating an example of an installation location that includes an installation area in which racks illustrated in FIG. 5 are installed.

The racks A illustrated in FIG. 5 are part of a plurality of racks A installed in an installation area IAA in an installation location IL illustrated in FIG. 6. The information processing system SYS2 includes all racks A installed in the installation location IL illustrated in FIG. 6. Each rack A installed in the installation location IL is an example of a housing.

The letter "A" at the third position from the left end of the server name assigned to each server SV indicates that the server SV is mounted at a position in a rack A installed in the installation area IAA. Of the four digits assigned to the server name of each server SV, the upper two digits indicate a rack number that identifies the position of the rack A in the installation area IAA, and the lower two digits indicates a position at which the server SV is mounted in the rack A. In the example illustrated in FIG. 5, each rack A has a storage space in which 42 servers SV may be mounted.

In each rack A, a plurality of servers SV, a power supply tap (PDU), and a second network switch (denoted by NSW2 in FIG. 5) coupled to the respective servers SV are mounted. The configuration of each server SV is similar to the configuration of the server SV illustrated in FIG. 2, and each server SV includes a BMC, a CPU, and a power supply unit PS. The power supply tap PDU receives electric power through a breaker BRK in the distribution board DISTA1 or DISTA2. The rated power value, which is the maximum value of electric power that the power supply tap PDU may supply, is determined depending on the rated current value of the breaker BRK. The second network switch NSW2 couples the first network switch NSW1 and all servers SV in the rack A together. Each server SV in each rack A and the second network switch NSW2 operate by receiving electric power from the distribution board DISTA1 or DISTA2 through a power supply cable coupled to a receptacle in the power supply tap PDU. In the description below, the rated power value of the power supply tap PDU will also be referred to as a rated power value of a rack.

The configurations of installation areas IA (IAB, IAC, IAD, IAE, IAF, IAG, IAH, IAI, and IAJ), illustrated in FIG. 6, which will be described later, are also similar to the configuration illustrated in FIG. 5. Specifically, in FIG. 6, each rack A (dotted) installed in each installation area IA has a space in which 42 servers SV may be mounted. One power supply tap PDU and one second network switch NSW2 coupled to all servers SV in the rack are mounted in each rack A.

The management server MSV is coupled to each server SV in each rack A through the first network switch NSW1 and the second network switch NSW2. When the management server MSV and the servers SV are mutually coupled through a LAN, the first network switch NSW1 and second network switch NSW2 are each a LAN switch. The management server MSV is coupled to each power supply tap PDU through a communication line and acquires information about a current value, which is used at each receptacle of the power supply tap PDU, from the power supply tap PDU through the communication line. The information about a current value used at each receptacle indicates the power consumption value of the server SV coupled to the receptacle or the power consumption value of the second network switch NSW2 coupled to the receptacle. On the basis of the current value acquired from each power supply tap PDU for respective receptacles, the management server MSV calculates the power consumption value of the server SV coupled to the receptacle and the power consumption value of the second network switch NSW2. An apparatus other than the server SV and second network switch NSW2, such as an uninterruptible power supply (UPS), may be coupled to the receptacle.

When the power supply tap PDU lacks a function to measure a current value for each receptacle, the management server MSV may acquire the power consumption value of each server SV from the BMC in the server SV through the first network switch NSW1 and second network switch NSW2. In this case, the management server MSV may acquire the power consumption value of an apparatus (such as the second network switch NSW2) that lacks the BMC by using, for example, the Simple Network Management Protocol (SNMP). The management server MSV may omit acquisition of the power consumption value of an apparatus having an almost fixed power consumption value and an apparatus having a power consumption value which is small enough to be negligible with respect to the total power consumption value of the rack, among apparatuses that receive electric power from the power supply tap PDU within the rack. When the management server MSV omits acquisition of the power consumption value of an apparatus having an almost fixed power consumption value, the management server MSV adds the almost fixed power consumption value to the total of the acquired power consumption values of other apparatuses.

The management server MSV has a configuration similar to the configuration of the server SV illustrated in FIG. 2. The management server MSV transmits and receives packets through the first network switch NSW1 and second network switch NSW2 to control a live migration. The BMCs in the management server MSV and each server SV perform information communication in accordance with the specifications of IPMI.

FIG. 6 illustrates an example of an installation location IL that includes an installation area IAA in which the racks A illustrated in FIG. 5 are installed. In other words, FIG. 6 illustrates an entire image of the information processing system SYS2 illustrated in FIG. 5. In FIG. 6, the management server MSV, first network switch NSW1, and distribution boards DIST are not illustrated.

In the installation location IL, 10 installation areas IA (IAA, IAB, IAC, IAD, IAE, IAF, IAG, IAH, IAI, and IAJ) are allocated. However, the number of installation areas IA is not limited to "10". In each installation area IA, 56 racks (dotted) and four air conditioners AIRC (hatched) are installed. The 56 racks are arranged in a matrix of 14 racks in the horizontal direction in FIG. 6 and four racks in the vertical direction in FIG. 6. In the installation area IAA, for example, the first digit assigned to the rack name of each rack A indicates a vertical position (row) in FIG. 6 and the remaining one or two digits assigned to the rack name of the rack indicates a horizontal position (column) in FIG. 6. That is, two or three digits assigned to the rack name of each rack A indicate the installation position of the rack A in, for example, a data center that implements the information processing system SYS2.

In a normal rack, which is a rack installed in, for example, installation area IAA, IAB, IAC, IAD, IAE, IAF, IAG, IAH, or IAI, servers SV that use virtual servers to start information processing are mounted. In a temporary rack, which is a rack installed in the installation area IAJ, servers SV are mounted to which virtual servers are moved from servers SV in normal racks by live migrations. In the description below, the installation areas IAA to IAI, in which normal racks are installed, will also be referred to as normal areas, and the installation area IAJ, in which temporary racks are installed, will also be referred to as a temporary area. Each normal rack is an example of a processing group that includes a plurality of servers SV that use virtual machines to start information processing. Each temporary rack is an example of a move destination group to which virtual machines are moved from a processing group.

Each rack corresponds to a group which is a unit of calculating electric power consumed in the rack and each group includes servers SV mounted in the rack. Each temporary rack installed in the temporary area IAJ is an example of another group that includes move destination servers SV, to which virtual servers implemented by servers SV mounted in normal racks are moved.

Figure 7:
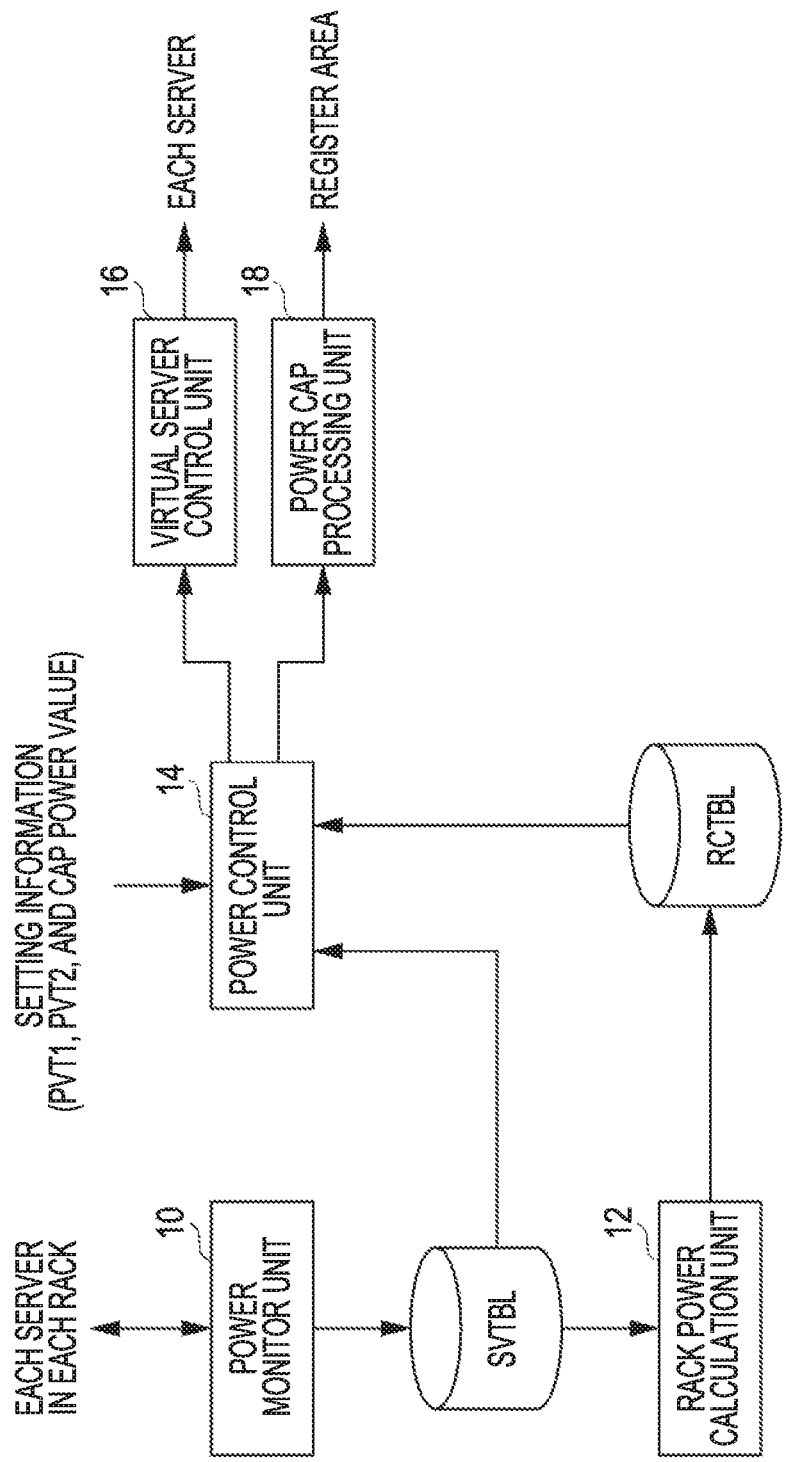
FIG. 7 is a diagram illustrating an exemplary functional configuration of a management server illustrated in FIG. 5.

FIG. 7 illustrates an exemplary functional configuration of the management server MSV illustrated in FIG. 5. An example of processing of the management server MSV will be described later with reference to FIG. 10. The management server MSV includes a power monitor unit 10, a rack power calculation unit 12, a power control unit 14, a virtual server control unit 16, and a power cap processing unit 18. The management server MSV also includes a server management table (denoted by SVTBL in FIG. 7), and a rack management table (denoted by RCTBL in FIG. 7). The power monitor unit 10, rack power calculation unit 12, power control unit 14, virtual server control unit 16, and power cap processing unit 18 may be implemented by a control program executed by the management server MSV or may be implemented by hardware in the management server MSV. The functions of the power monitor unit 10, rack power calculation unit 12, power control unit 14, virtual server control unit 16, and power cap processing unit 18 may be implemented by, for example, causing the CPU in the management server MSV to execute the control program stored in the memory.

The power monitor unit 10 acquires a server's power value from the power supply tap PDU in each rack or from the BMC in each server SV in each rack at a predetermined interval, and stores the acquired power consumption value in the server management table SVTBL together with the date and time of the acquisition. The power monitor unit 10 is an example of an acquisition unit that acquires a power consumption value from each of a plurality of servers SV. An example of the server management table SVTBL is illustrated in FIG. 8.

On the basis of the power consumption value of each server SV stored in the server management table SVTBL, the rack power calculation unit 12 calculates a power consumption value, which is the value of electric power used through the power supply tap PDU included in each rack, and stores the calculated power consumption value in the rack management table RCTBL. In the description below, the power consumption value of the power supply tap PDU in each rack will also be referred to as a rack's power value. The rack power calculation unit 12 calculates the rack's power value of each rack each time the server management table SVTBL is updated, and stores the calculated rack's power value in the rack management table RCTBL. The rack power calculation unit 12 is an example of a calculation unit that calculates, for each group, a total power consumption value which is a total of the power consumption values of the servers SV belonging to the group, on the basis of the power consumption value of each of a plurality of servers SV. An example of the rack management table RCTBL is illustrated in FIG. 9.

The power control unit 14 determines whether to execute a live migration, on the basis of various types of setting information, the power consumption value of each server SV stored in the server management table SVTBL, and the rack's power value of each rack stored in the rack management table RCTBL. When the power control unit 14 determines that a live migration is to be executed, the power control unit 14 notifies the virtual server control unit 16 of information indicating a move source server SV from which virtual servers are to be moved and information indicating a move destination server SV to which the virtual servers are to be moved.

The term "live migration" means processing to move virtual servers from a normal rack to a temporary rack or processing to move virtual servers from a temporary rack to a normal rack. The power control unit 14 is an example of a control unit that moves, to a temporary rack, virtual servers implemented by a server SV out of the servers SV mounted in a rack among the plurality of racks. The server SV has the largest power consumption value and the rack has the total power consumption value that exceeds the threshold PVT1.

Setting information includes thresholds PVT1 and PVT2 as well as a cap power value, which is a power consumption value of a rack at which power capping is started. For example, the setting information is stored in a storage device such as a register, a read-only memory (ROM), or the like, provided in the management server MSV. The threshold PVT1 is a power value that is compared with a rack's power value to determine whether to execute a live migration to move virtual servers from a normal rack to a temporary rack. The threshold PVT2, which is lower than the threshold PVT1, is a power value that is compared with a rack's power value to determine whether to execute a live migration to move virtual servers from a temporary rack to a normal rack.

As a result of moving virtual servers from a normal rack, which has a rack's power value exceeding the threshold PVT1, to a temporary rack in the temporary area IAJ, the rack's power value of the temporary rack may exceed the threshold PVT1. In this case, the power control unit 14 does not execute a live migration. That is, when no rack in the temporary area IAJ has a margin in the rack's power value, the power control unit 14 suppresses the execution of a live migration. In this case, the power control unit 14 notifies the power cap processing unit 18 of information indicating servers SV mounted in the normal rack having a rack's power value exceeding the threshold PVT1, for which power capping is to be executed, as well as the cap power value included in the setting information. That is, power capping is uniformly executed for all servers SV mounted in a normal rack having a rack's power value exceeding the threshold PVT1.

The virtual server control unit 16 controls servers SV, for which a live migration is to be executed, on the basis of information received from the power control unit 14 to execute a live migration.

The power cap processing unit 18 receives, from the power control unit 14, the information indicating servers SV, for which power capping is to be executed, and the cap power value, and stores the received information and cap power value in a register area or the like that is referenced by a power cap program that controls power capping. The power cap program causes the servers SV, for which power capping is to be executed, to execute power capping, on the basis of information stored in the register area or the like. The power capping is executed by lowering at least one of the power supply voltage or clock frequency of the CPU mounted in each of the servers SV to reduce the power consumption of the server SV to or below the cap power value.

FIG. 8 illustrates an example of the server management table SVTBL illustrated in FIG. 7. The server management table SVTBL has, for each server SV, fields in which a server name, a rack name, an in-rack position, an apparatus name, a serial number, a date and time of acquisition, and a server's power value are stored.

In the server name field, information that identifies one server SV is stored. In the rack name field, information that identifies a rack in which the server SV is mounted is stored. In the in-rack position field, information indicating the storage position in the rack at which the server SV is mounted is stored. In the apparatus name field, information indicating the product name of the server SV is stored. In the serial number field, a number specific to the server SV, such as a manufacturing number, is stored. In the data and time of acquisition field, the data and time at which the power consumption value of the server SV is acquired by the power monitor unit 10 illustrated in FIG. 7 is stored. In the server's power value field, the power consumption value (in watts) of the server SV acquired by the power monitor unit 10 illustrated in FIG. 7 is stored.

Information indicating the server name, rack name, in-rack position, apparatus name, and serial number is set in the server management table SVTBL when or before the information processing system SYS2 is started. Information indicating the date and time of acquisition and the server's power value is set by the power monitor unit 10 illustrated in FIG. 7.

FIG. 9 illustrates an example of the rack management table RCTBL illustrated in FIG. 7. The rack management table RCTBL has, for each server SV, fields in which a server name, a rack name, an in-rack position, an apparatus name, a serial number, a date and time of acquisition, and a server's power value are stored, as in the server management table SVTBL illustrated in FIG. 8. The rack management table RCTBL also has, for each rack, a field in which the rack's power value calculated by the rack power calculation unit 12 illustrated in FIG. 7 is stored.

Figure 10:
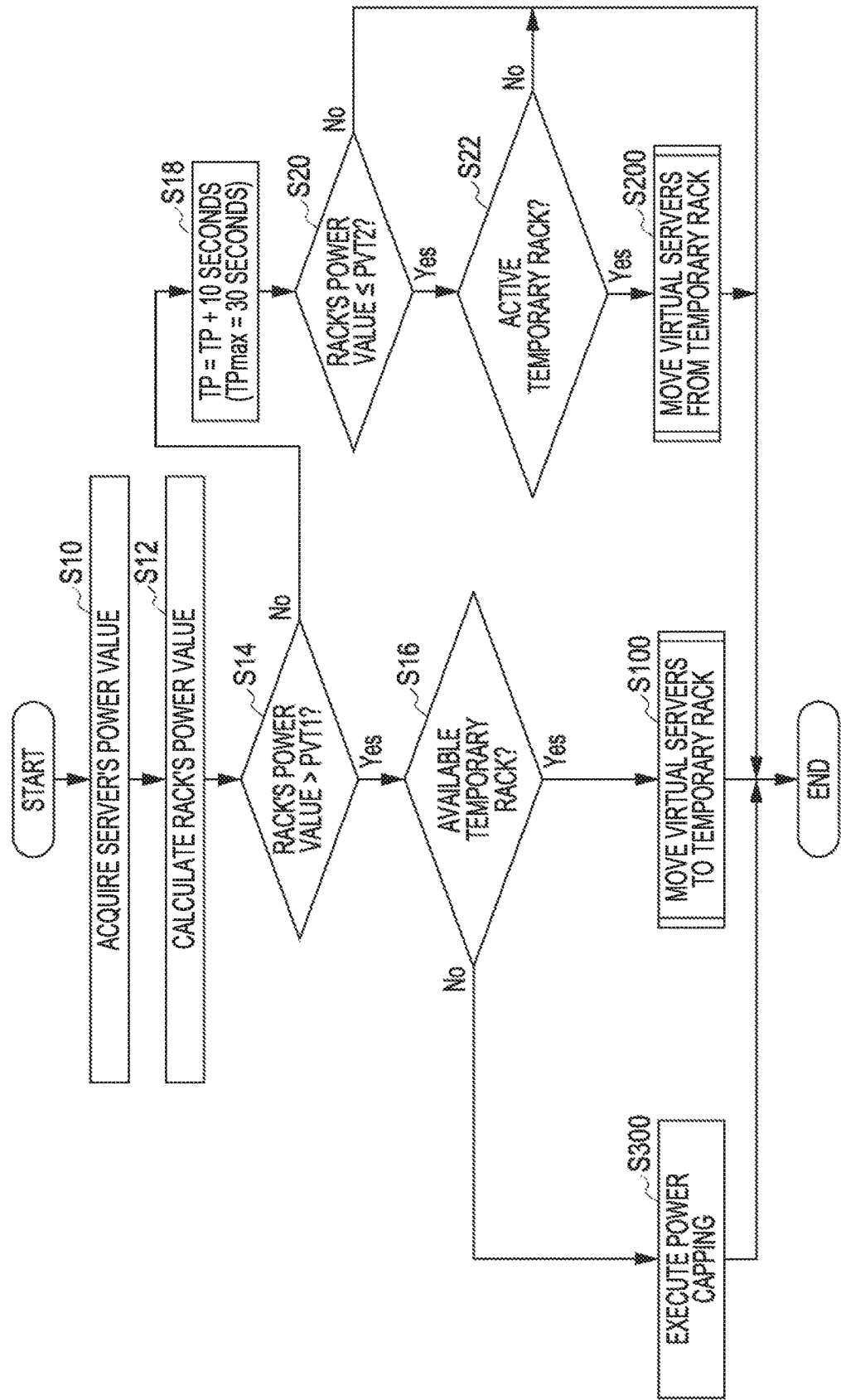
FIG. 10 is a diagram illustrating an example of processing of the management server illustrated in FIG. 5.

FIG. 10 illustrates an example of processing of the management server MSV illustrated in FIG. 5. Detailed descriptions of processing similar to processing illustrated in FIG. 4 will be omitted. The processing illustrated in FIG. 10 is implemented by, for example, a control program, and is repeatedly executed by the management server MSV at a predetermined interval TP for each rack. That is, FIG. 10 illustrates an example of a flow of a method of controlling an information processing system and a processing flow of a control program executed by the management apparatus. Although the initial value of the interval TP is 30 seconds, and the interval TP changes within the range of 10 to 30 seconds along with the processing illustrated in FIG. 10, this is not a limitation.

First, in S10, the power monitor unit 10 in the management server MSV acquires the value of electric power consumed by each server SV mounted in a target rack. The power monitor unit 10 stores the acquired server's power values in the server management table SVTBL.

Next, in S12, the power control unit 14 in the management server MSV calculates the rack's power value (that is, total power consumption value) of the target rack on the basis of the server's power values acquired in S10. The power control unit 14 stores the calculated rack's power value in the rack management table RCTBL.

Next, in S14, the power control unit 14 in the management server MSV determines whether the rack's power value exceeds the threshold PVT1. When the rack's power value exceeds the threshold PVT1, the power control unit 14 proceeds to S16. When the rack's power value is lower than or equal to the threshold PVT1, the power control unit 14 proceeds to S18. The threshold PVT1 is set to, for example, about 95% of the rated power value of the rack.

In S16, the power control unit 14 determines whether there is an available temporary rack to which virtual servers implemented by servers SV mounted in the excessively power-consuming rack, which have a rack's power value exceeding the threshold PVT1, may be moved. For example, when both of a first and second conditions described below are satisfied, the power control unit 14 determines that there is an available temporary rack to which virtual servers implemented by servers SV mounted in the excessively power-consuming rack may be moved. In this case, the power control unit 14 proceeds to S100 to execute a live migration. When the first or second condition is not satisfied, the power control unit 14 determines that there is no available temporary rack to which virtual servers implemented by servers SV mounted in the excessively power-consuming rack may be moved. In this case, the power control unit 14 proceeds to S300 to execute power capping.

First condition: a difference between the threshold PVT1 and the rack's power value of a temporary rack is larger than a difference between the rack's power value of the excessively power-consuming rack and the threshold PVT1. That is, even when virtual servers are moved to the temporary rack, the rack's power value of the temporary rack does not exceed the threshold PVT1.

Second condition: a storage device such as an HDD in a server SV mounted in the temporary rack has a storage capacity enough to store data of the virtual servers.

Figure 11:
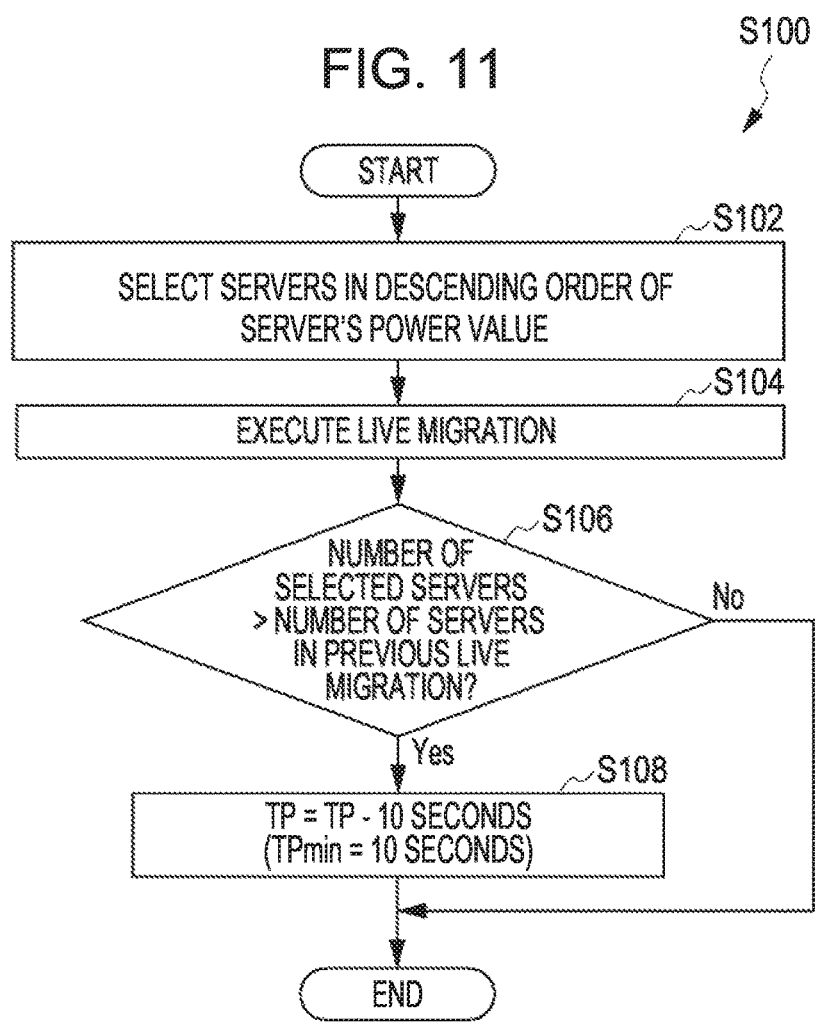
FIG. 11 is a diagram illustrating an example of processing in S100 illustrated in FIG. 10.

In S100, the power control unit 14 and virtual server control unit 16 execute a live migration from the normal rack to the temporary rack. An example of processing in S100 is illustrated in FIG. 11.

In S300, the power control unit 14 notifies the power cap processing unit 18 of information indicating servers SV, for which power capping is to be executed, and the cap power value. The cap power value is set to, for example, 97% of the rated power value of the rack. On the basis of the information received from the power control unit 14, the power cap processing unit 18 causes the servers SV, for which power capping is to be executed, to execute power capping. That is, when it is difficult to move virtual servers from a normal rack having a rack's power value exceeding the threshold PVT1 to a temporary rack, the management server MSV causes servers SV mounted in the normal rack having a rack's power value exceeding the threshold PVT1 to execute power capping. Power capping is preferably executed in all servers SV mounted in the normal rack having a rack's power value exceeding the threshold PVT1. However, power capping may be executed only in servers SV that have a power consumption value higher than a threshold value, among the servers SV mounted in the normal rack having a rack's power value exceeding the threshold PVT1. Thus, even when it is difficult to move virtual servers from a normal rack to a temporary rack, it is possible to keep a rack's power value from exceeding the rated power value of the rack by executing power capping.

When the rack's power value of the normal rack is lower than or equal to the threshold PVT1, the management server MSV prolongs the interval TP, at which the processing illustrated in FIG. 10 is executed, by 10 seconds in S18, and thereafter proceeds to S20. The maximum value TPmax of the interval TP is 30 seconds. When the interval TP is already set to 30 seconds, processing in S18 is omitted. When the interval TP is prolonged, a server's power value is less frequently acquired and rack's power value is less frequently calculated, so the power consumption of the information processing system SYS2 may be reduced.

In S20, the power control unit 14 determines whether the rack's power value of the normal rack is lower than or equal to the threshold PVT2. The threshold PVT2 is used to determine whether the virtual servers moved to a temporary rack may be returned to the normal rack. The threshold PVT2 is set to, for example, about 80% of the rated power value of the rack. When the rack's power value of the normal rack is lower than or equal to the threshold PVT2, the power control unit 14 determines that a live migration from a temporary rack to the normal rack is possible and proceeds to S22. When the rack's power value of the normal rack is higher than the threshold PVT2, the power control unit 14 determines that a live migration from a temporary rack to the normal rack is difficult and terminates the processing. When the threshold PVT2, which is lower than the threshold PVT1, is used to determine whether virtual servers may be returned from a temporary rack to the normal rack, it is possible to lower the possibility that the rack's power value of the normal rack to which virtual servers are returned from a temporary rack exceeds the threshold PVT1.

In S22, the power control unit 14 asks the virtual server control unit 16 whether there is a temporary rack (active temporary rack) in which virtual servers are implemented. When there is an active temporary rack, the power control unit 14 proceeds to S200. When there is no active temporary rack, the power control unit 14 terminates the processing.

In S200, the power control unit 14 and virtual server control unit 16 execute a live migration from the temporary rack to the normal rack. An example of processing in S200 is illustrated in FIG. 11.

In the example illustrated in FIG. 10, the thresholds PVT1 and PVT2 are determined on the basis of, for example, an empirical rule; the threshold PVT1 is set to 96% of the rated power value of the rack and threshold PVT2 is set to 83% of the rated power value of the rack. The rated power value of the rack is determined depending on the rated current value of the breaker BRK illustrated in FIG. 5.

An operation time taken from when a current flowing in the breaker BRK exceeds the rated current value until when the breaker BRK is shut down is prescribed in Article 33 in "Interpretation of technical standards of electrical equipment" established by Electric Power Safety Division, Commerce Distribution and Industrial Safety Policy Group, Ministry of Economy, Trade and Industry (METI), Japan. For example, the maximum value of the operation time of a breaker BRK with a rated current value of 30 amperes or less is 60 minutes when a current with 1.25 times the rated current value flows, and is 2 minutes when a current with twice the rated current value flows. Here, the operation time is a time period from when the stipulated current flows until when the breaker BRK is shut down. The minimum operation time is guaranteed by the manufacturer of the breaker BRK. The minimum operation time of some breakers BRK is about several tens of seconds when a current with twice the rated current value flows in the breakers BRK. While the information processing system SYS2 is operating normally, a current with twice the rated current value will not flow.

Therefore, even when the threshold PVT1 is set to the rated power value of a rack, which corresponds to the rated current value of the breaker BRK, it is possible to keep the breaker BRK from being shut down if a live migration is executed within the minimum operation time to reduce the power consumption value of the rack. In other words, in the example illustrated in FIG. 10, the threshold PVT1 is set to 96% of the rated power value of the rack so as to have a margin. To execute a live migration before the breaker BRK is shut down, processing illustrated in FIG. 10 (that is, acquisition of the server's power value) is preferably repeated at intervals shorter than the minimum operation time of the breaker BRK. For example, the maximum value (30 seconds) of the interval TP, at which the processing illustrated in FIG. 10 is repeatedly executed, is set depending on the minimum operation time of the breaker BRK. When an interval at which the server' power value is repeatedly acquired is set depending on the minimum operation time of the breaker BRK, even when the rack's power value exceeds the rated power value of the rack, it is possible to execute a live migration before the breaker BRK is shut down to reduce the power consumption value of the rack.

FIG. 11 illustrates an example of processing in S100 illustrated in FIG. 10. First, in S102, on the basis of information stored in the rack management table RCTBL, the power control unit 14 selects servers SV in descending order of the server's power value, until the accumulated server's power value becomes larger than or equal to a difference between the rack's power value and the threshold PVT1. That is, the power control unit 14 selects servers SV for which a live migration is to be executed to reduce the rack's power value to or below threshold PVT1.

Next, in S104, the power control unit 14 notifies the virtual server control unit 16 of information indicating the servers SV selected in S102 and information indicating the temporary rack having the smallest rack's power value among the temporary racks. On the basis of the information received from the power control unit 14, the virtual server control unit 16 executes a live migration of moving virtual servers implemented by the servers SV selected in S102 to the temporary rack. That is, the management server MSV moves, in descending order of the server's power value, virtual servers implemented by the servers SV to reduce the rack's power value of the normal rack having the rack's power value exceeding the threshold PVT1 to or below the threshold PVT1. Thus, when S100 is executed once, it is possible to reduce the rack's power value of the normal rack having the rack's power value exceeding the threshold PVT1 to or below the threshold PVT1. The temporary rack to which virtual servers are moved from the normal rack is not limited to the temporary rack having the smallest rack's power value but any temporary rack may be selected on the condition that the virtual servers may be moved to the temporary rack.

Next, in S106, the power control unit 14 determines whether the number of servers SV selected in S102 is larger than the number of servers SV involved in the previous live migration. When the number of servers SV selected in S102 is larger than the number of servers SV involved in the previous live migration, the power control unit 14 proceeds to S108. When the number of servers SV selected in S102 is smaller than or equal to the number of servers SV involved in the previous live migration, the power control unit 14 terminates the processing.

Since S100 is executed for each normal rack, the rack for which a determination is made in S106 is the normal rack for which a determination is made in S14 illustrated in FIG. 10. When the rack's power value exceeds the threshold PVT1 after the elapse of the interval TP even after the execution of a live migration, the power control unit 14 determines that the rack's power value is rapidly increased.

In S108, the power control unit 14 shortens the interval TP, at which the processing illustrated in FIG. 10 is repeated, by 10 seconds and terminates the processing. That is, when the rack's power value of the normal rack that includes the server SV from which virtual machines are moved to a temporary rack tends to increase and the threshold PVT1 is exceeded again, the power control unit 14 shortens the interval TP. The minimum value TPmin of the interval TP is 10 seconds. When the interval TP is already set to 10 seconds, processing in S108 is omitted.

When the interval TP is shortened, a rack's power value is more frequently calculated, so a live migration, which is executed when a rack's power value exceeds the threshold PVT1, is more frequently executed. As a result, it is possible to keep the rack's power value from exceeding the rated power value of the rack after exceeding the threshold PVT1 within the interval TP.

The interval TP may be fixed to a predetermined value (30 seconds, for example). In this case, the management server MSV does not execute processing in S106 and S108 illustrated in FIG. 11 and processing in S18 illustrated in FIG. 10. When the interval TP is fixed to a predetermined value, in S102, the power control unit 14 may select one of the servers SV having the largest power consumption value with reference to the information stored in the rack management table RCTBL. In this case, S100 is repeatedly executed until the rack's power value falls to or below the threshold PVT1.

Figure 12:
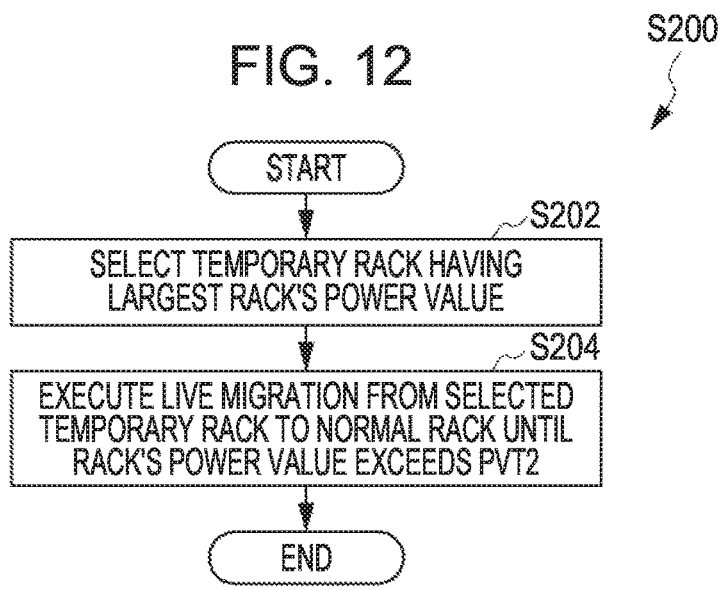
FIG. 12 is a diagram illustrating an example of processing in S200 illustrated in FIG. 10.

FIG. 12 illustrates an example of processing in S200 illustrated in FIG. 10. First, in S202, the power control unit 14 selects a temporary rack having the largest rack's power value from the temporary racks. The power control unit 14 may use a least recently used (LRU) method or a round-robin method to select one of the temporary racks in which virtual servers are implemented.

Next, in S204, the power control unit 14 executes a live migration to move virtual servers from the selected temporary rack to the target normal rack for which a determination is made in S20 illustrated in FIG. 10 until the rack's power value of the target normal rack exceeds the threshold PVT2. The power control unit 14 determines whether the rack's power value of the normal rack exceeds the threshold PVT2, with reference to the information stored in the rack management table RCTBL. When the threshold PVT2 is exceeded, the power control unit 14 terminates the processing illustrated in FIG. 12.

FIG. 13 illustrates an example of processing of the information processing system SYS2 illustrated in FIG. 5. In the example illustrated in FIG. 13, virtual servers are moved from a normal rack to a temporary rack. For example, the management server MSV executes, by changing the target normal rack, the processing illustrated in FIG. 10 in each period indicated by a hatched rectangle. In FIG. 13, power cap processing is not executed.

The management server MSV asks for a server's power value for each of all the racks illustrated in FIG. 6 at the predetermined interval TP and receives a notification of a server' power value from each server SV in each rack (S13*a*, S13*b*, S13*c*, and S13*d* in FIG. 13). The management server MSV then calculates the rack's power value of each normal rack as described above with reference to FIG. 10, and when the rack's power value of a normal rack exceeds the threshold PVT1, executes a live migration to move virtual servers from the normal rack to a temporary rack (S13*e* in FIG. 13). In the example illustrated in FIG. 13, the management server MSV moves virtual servers from the normal rack A12 to the temporary rack J11. The management server MSV also notifies the operator of the information processing system SYS2 of information indicating that a live migration has been executed (S13*f* in FIG. 13). For example, to notify the operator of the execution of a live migration, the management server MSV displays, on a display device, information indicating that a live migration has been executed.

FIG. 14 illustrates another example of processing of the information processing system SYS2 illustrated in FIG. 5. In the example illustrated in FIG. 14, virtual servers are moved from a temporary rack to a normal rack. The similar processing as illustrated in FIG. 13 will not be described in detail. In FIG. 14, power cap processing is not executed.

The management server MSV asks for a server's power value for each rack at the predetermined interval TP and receives a notification of a server' power value from each server SV in the rack (S14*a*, S14*b*, S14*c*, and S14*d* in FIG. 14), similarly as illustrated in FIG. 13. When the calculated rack's power value of a normal rack is lower than or equal to the threshold PVT2, the management server MSV executes a live migration to move virtual servers from a temporary rack to the normal rack (S14*e* in FIG. 14). In the example illustrated in FIG. 14, the management server MSV moves virtual servers from the temporary rack J11 to the normal rack A12. The management server MSV also notifies the operator of the information processing system SYS2 of information indicating that a live migration has been executed (S14*f* in FIG. 14).

FIG. 15 illustrates an example of processing during a test operation of the information processing system SYS2 illustrated in FIG. 5. The test operation is executed to determine the number of servers SV to be mounted in each rack. The test operation is executed by running 10 servers SV mounted in each of 14 racks, A11 to A114, (a total of 140 servers SV), for example.

First, the management server MSV receives information about an environment of the test operation, such as the rated power value of the rack and the number of servers SV to be mounted in each rack, through an input device such as a keyboard or a mouse, which is manipulated by the operator (S15a in FIG. 15). After that, each server SV continues to execute data processing in which processing in an actual operation of the information processing system SYS2 is assumed. Thus, the power consumption value of each server SV changes with a similar tendency as a power consumption value in an actual operation of the information processing system SYS2.

The management server MSV asks for a server's power value for each of the racks A11 to A114 at the predetermined interval TP and receives a notification of a server' power value from each server SV in the rack (S15b in FIG. 15), similarly as illustrated in FIG. 13. Each time the management server MSV receives a server's power value from a server SV, the management server MSV stores the received server's power value in a storage device such as an HDD.

The management server MSV executes the test operation until a period TESTP elapses, and after the elapse of the period TESTP, calculates the average of server's power values stored in the storage device such as an HDD (S15c in FIG. 15). The period TESTP is set to, for example, one week. The management server MSV divides the rated power value of the rack by the average of server's power values to calculate the number of servers SV to be mounted in each normal rack (S15d in FIG. 15). The management server MSV then notifies the operator of the calculated number of servers SV (S15e in FIG. 15).

For example, when the rated power value of the rack is 4.8 kW and the average (actual value) of the server's power values is 240 W, then the maximum number of servers SV that may be mounted in each rack is "20". Since apparatuses other than servers SV such as the second network switch NSW2 are also mounted in each rack, the number of servers SV to be mounted in each rack is set to, for example, "18" with a margin. When the average of server's power values is used to calculate the maximum number of servers SV that may be mounted in each rack, the maximum number of servers SV that may be mounted in each rack may be increased when compared with a case in which the rated power value of the server SV is used to calculate the maximum number of servers SV that may be mounted in each rack.

FIG. 16 illustrates an example of power consumption values in the information processing system SYS2 illustrated in FIG. 5. The installation location IL in which the information processing system SYS2 is installed includes nine normal areas IAA to IAI and one temporary area IAJ, as illustrated in FIG. 6. The information processing system SYS2 uses five normal areas IAA to IAE out of the nine normal areas IAA to IAI and the one temporary area IAJ to provide a cloud computing service. Assume that a comparative information processing system uses all of the installation areas IAA to IAJ in the installation location IL to provide a cloud computing service and does not execute a live migration. As illustrated in FIG. 6, 56 racks are installed in each installation area IA.

In the information processing system SYS2, 18 servers SV are mounted in each rack. Therefore, a total of 5040 servers SV may be mounted in the five normal areas IAA to IAE, and a total of 1008 servers SV may be mounted in the temporary area IAJ. When the average power consumption value of each server SV in the normal areas IAA to IAE is 240 W, the average of the power consumption values in each rack is 4.32 kW. When the average power consumption value of each server SV in the temporary area IAJ is 108 W, the average of the power consumption values in each rack is 1.94 kW. To simplify the description, it is assumed that the power consumption value of each rack is calculated based on only the power consumption values of the servers SV therein. In the comparative information processing system, a total of 5600 servers SV are mounted in the ten installation areas IAA to IAJ, and the average power consumption value of each rack is 2.4 kW.

In the information processing system SYS2 and the comparative information processing system, the number of servers SV to be mounted in each rack is determined as described below.

In the information processing system SYS2, the number of servers SV to be mounted in each rack is determined on the basis of the upper limit (4.6 kW) of the power consumption value of the rack and the average power consumption value (240 W) calculated on the assumption that the average operation rate of each server SV mounted in each rack in the normal areas IAA to IAI is 60%. The number of servers SV to be mounted in each rack in the temporary area IAJ is the same as the number of servers SV to be mounted in each of the normal areas IAA to IAE. A relationship between the operation rate of each server SV and the power consumption value of each server SV is illustrated in FIG. 17. The upper limit of the power value of each rack is set to about 95% of the rated power value (4.8 kW, for example) of each rack. The upper limit of the power value, which corresponds to the threshold PVT1, is used to determine whether to execute a live migration.

In an initial state of the temporary area IAJ, in which virtual servers are yet to be moved by a live migration, the operation rate of each server SV mounted in each rack in the temporary area IAJ is 0% and the average power consumption value of each server SV in each rack is 108 W. Although FIG. 16 illustrates an example in which all servers SV mounted in each rack in the temporary area IAJ consume 108 W in the initial state, only the servers SV in one rack may consume 108 W. That is, the servers SV mounted in the remaining 55 racks may be powered on one rack at a time in response to a determination made to move virtual servers by a live migration. This enables the power consumption of the information processing system SYS2 to be reduced when compared with a case in which all servers SV mounted in the temporary area IAJ are started.

In the comparative information processing system, the number of servers SV to be mounted in each rack is determined so that the power consumption value of each rack becomes about 50% of the rated power value (4.8 kW) of the rack when the operation rate of each server SV is 60% (the power consumption value is 240 W). In the comparative information processing system in the example illustrated in FIG. 16, the number of servers SV to be mounted in each rack is "10". Therefore, even when the operation rate of each server SV in the comparative information processing system is 100% (the power consumption value is 340 W), the power consumption value of each rack is suppressed to 3.4 kW, which is about 70% of the rated power value of the rack, so the comparative information processing system is stably operated.

In the information processing system SYS2 illustrated in FIG. 5, as described above, the number of servers SV to be mounted in each rack is "18", which is 1.8 times the number of servers SV (10 servers SV) to be mounted in each rack in the comparative information processing system. When the information processing system SYS2 and the comparative information processing system execute the same information processing, the number of installation areas IA to be used in the information processing system SYS2, which is "6", is 60% of the number of installation areas IA used in the comparative information processing system, which is "10". That is, in the information processing system SYS2, the number of installation areas IA to be used may be reduced below the number of installation areas IA to be used in the comparative r information processing system. Therefore, it is possible to increase the mounting density of servers SV without lowering performance in information processing.

Since the number of installation areas IA to be used may be reduced, when the information processing system SYS2 is used in, for example, a cloud computing service, profits per unit area in a data center may be increased when compared with the comparative information processing system. In addition, in the information processing system SYS2, the installation areas IAF to IAI illustrated in FIG. 6 are not used in a cloud computing service, so servers SV, such as rental servers, that execute other information processing, may be mounted in each rack in the installation areas IAF to IAI. This may further improve the performance of the information processing system SYS2.

In the information processing system SYS2, the power consumption value of all servers SV (6048 servers SV) used in a cloud computing service is 1318 kW. By comparison, in the comparative information processing system, the power consumption value of all servers SV (5600 servers SV) used in the cloud computing service is 1344 kW. In the information processing system SYS2, the operation rate of the air conditioners AIRC in the normal areas IAA to IAE is 63% and the operation rate of the air conditioners AIRC in the temporary area IAJ is 28%. By comparison, in the comparative information processing system, the operation rate of the air conditioners AIRC in the installation areas IAA to IAI is 35%. The operation rate of the air conditioner AIRC is calculated by using equation (1) below. The rated power value of each air conditioner AIRC is assumed to be 96 kW.

Operation rate of air conditioner=Power consumption value of each installation area IA/(number of air conditioners in each installation area IA×rated power value of air conditioner)   (1)

Figure 18:
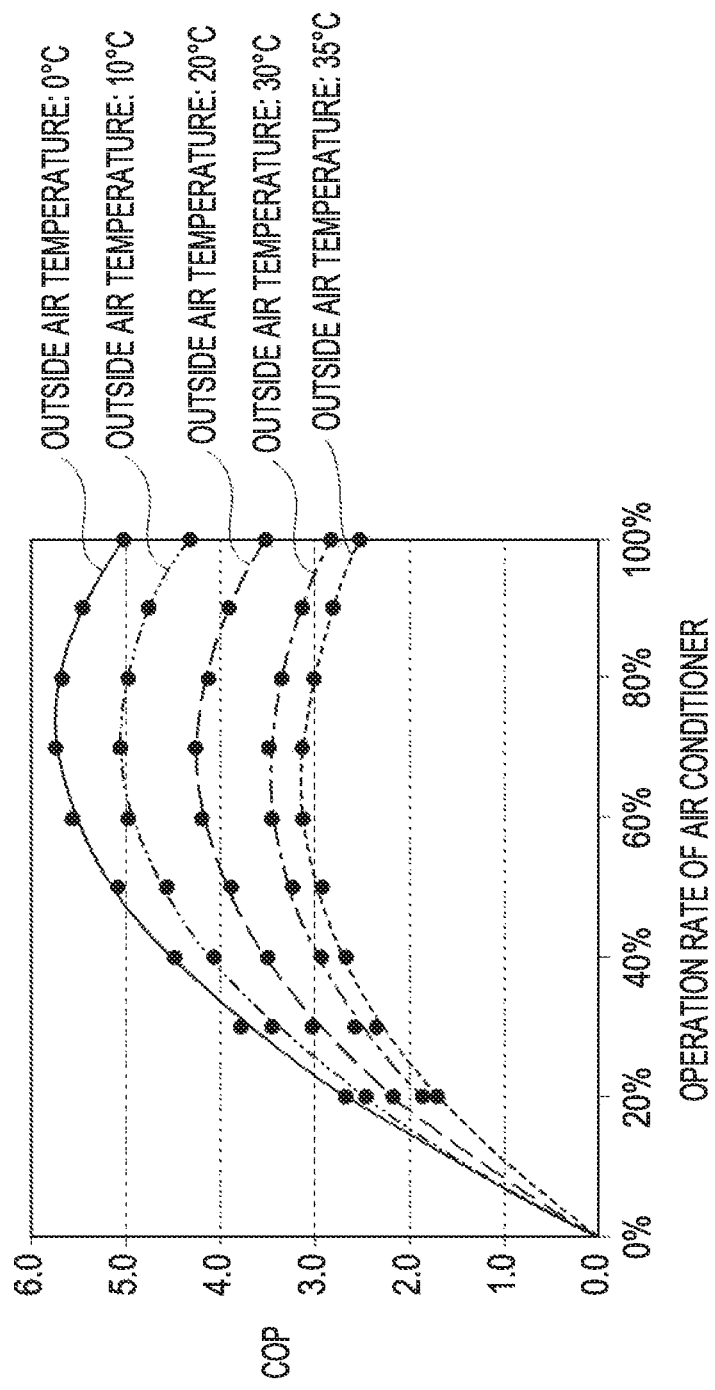
FIG. 18 is a diagram illustrating an example of characteristics of the capacity of an air conditioner illustrated in FIG. 6.

The coefficient of performance (COP) of the air conditioner AIRC is determined on the basis of the outside air temperature and the characteristics of the capacity of the air conditioner AIRC. The characteristics depend on the operation rate of the air conditioner AIRC. The outside air temperature, which is the temperature of air exhausted from the air conditioner AIRC, is assumed to be 20 degrees Celsius. It is also assumed that the temperature of air exhausted from the server SV that has inhaled air at 20 degrees Celsius is, for example, 32 degrees Celsius. An example of the characteristics of the capacity of the air conditioner AIRC is illustrated in FIG. 18.

The power consumption value of each air conditioner AIRC is expressed as in equation (2). The power consumption value of the compressor in equation (2) is represented as in equation (3). An indoor fan and the compressor are disposed in each air conditioner AIRC. The power consumption value of the indoor fan in each air conditioner AIRC is, for example, 6 kW.

Power consumption value of air conditioner=(power consumption value of indoor fan+power consumption value of compressor)   (2)

Power consumption value of compressor=rated power value of air conditioner×operation rate of air conditioner÷COP−power consumption value of indoor fan   (3)

From equations (2) and (3), it is found that in the information processing system SYS2, the power consumption value of each air conditioner AIRC in the normal areas IAA to IAE is 14.4 kW and the power consumption value of each air conditioner AIRC in the temporary area IAJ is 9.6 kW. Then, the total power consumption value of the air conditioners AIRC in the information processing system SYS2 is 326 kW (14.4 kW×4×5+9.6 kW×4×1). In each installation areas IA in the comparative information processing system, the power consumption value of each air conditioner AIRC is 10.5 kW. Then, the total power consumption value of the air conditioners AIRC in the comparative information processing system is 420 kW (10.5 kW×4×10). The information processing system SYS2 may achieve a reduction of 94 kW (22.3%) in the total power consumption value of the air conditioners AIRC with respect to the total power consumption value of the air conditioners AIRC in the comparative information processing system.

As described above, the total power consumption value of the information processing system SYS2 is 1644 kW (1318 kW+326 kW), and the total power consumption value of the comparative information processing system is 1764 kW (1344 kW+420 kW). The information processing system SYS2 may achieve a reduction of 120 kW (6.8%) in its total power consumption value with respect to the total power consumption value of the comparative information processing system.

FIG. 17 illustrates an example of a relationship between the power consumption value of each server SV installed in the installation location IL illustrated in FIG. 6 and the operation rate of the server SV. The characteristics illustrated in FIG. 17 are taken when the thermal design power (TDP), which is an index of the maximum amount of generated heat, of a large-scale integration (LSI), such as a processor, which is mounted in the server SV is 95 W. When no server SV is being operated, that is, in the initial state in which virtual servers are yet to be moved by a live migration, the operation rate of each server SV is 0% and its average power consumption value is 108 W. When the average operation rate of each server SV is assumed to be 60%, its power consumption value is 240 W. When the operation rate of each server SV is 100%, its power consumption value (maximum value) is 340 W.

FIG. 18 illustrates an example of the characteristics of the capacity of the air conditioner AIRC illustrated in FIG. 6. The power consumption value of each air conditioner AIRC illustrated in FIG. 16 is calculated by using the COP derived from the characteristics at an outside air temperature of 20 degrees Celsius.

According to the second embodiment described above with reference to FIGS. 5 to 18 as well, similar effects as in the first embodiment illustrated in FIG. 1 may be obtained. That is, when virtual servers are moved from a normal rack to a temporary rack, it is possible to keep the rack's power value from exceeding the rated power value of the normal rack. This may increase the mounting density of servers SV and may improve the performance of the information processing system SYS2. Since it is possible to keep the rack's power value from exceeding the rated power value of the normal rack, the reliability of the information processing system SYS2 may be improved. Since the servers SV mounted in the temporary rack are used only as destinations to which virtual servers are moved, the management server MSV may easily control the movement of the virtual servers when compared with a case in which destinations to which virtual servers are moved are not predetermined.

Furthermore, according to the second embodiment, the management server MSV selects servers SV from a normal rack in descending order of the server's power value, and executes a live migration. Therefore, when S100 illustrated in FIG. 10 is executed once, it is possible to reduce the power consumption value of a normal rack having a rack's power value exceeding the threshold PVT1 to or below the threshold PVT1. As a result, it is possible to minimize an increase in the load of the information processing system SYS2 through a live migration.

When the threshold PVT2, which is lower than the threshold PVT1, is used to determine whether to return virtual servers from a temporary rack to the normal rack, it is possible to lower the possibility that the rack's power value of the normal rack to which virtual servers are returned from the temporary rack exceeds the threshold PVT1. Even when it is difficult to move virtual servers from a normal rack to a temporary rack, it is possible to keep a rack's power value from exceeding the rated power value of the rack by executing power capping.

By shortening the interval TP when the rack's power value of a normal rack tends to increase, a live migration may be more frequently executed. As a result, it is possible to keep the rack's power value from exceeding the rated power value of the rack after exceeding the threshold PVT1 within the interval TP. By prolonging the interval TP when the rack's power value of the normal rack is lower than or equal to the threshold PVT1, a server's power value is less frequently acquired and a rack's power value is less frequently calculated, so the power consumption of the information processing system SYS2 may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A management apparatus, comprising:
   a memory; and
   a processor coupled to the memory and the processor configured to
   acquire a power consumption value of respective information processing apparatuses divided into groups, the power consumption value being a value of electric power consumed by the respective information processing apparatuses,
   calculate a total power consumption value of the respective groups, the total power consumption value of a group being a sum of the power consumption values of information processing apparatuses belonging to the group,
   select a first group from among the groups, the first group having a first total power consumption value which exceeds a first threshold,
   select a first information processing apparatus belonging to the first group, the first information processing apparatus having a largest power consumption value among power consumption values of information processing apparatuses belonging to the first group, and
   move first virtual machines implemented by the first information processing apparatus to a second group among the groups, the second group being different from the first group.

2. The management apparatus according to claim 1, wherein
   information processing apparatuses belonging to the respective groups are mounted in housings corresponding to the respective groups, and
   the processor is configured to
   calculate the total power consumption value of the respective groups by summing up the power consumption values of information processing apparatuses mounted in a same housing.

3. The management apparatus according to claim 1, wherein
   the processor is configured to
   select second information processing apparatuses belonging to the first group in descending order of the power consumption value until the total power consumption value of a third information processing apparatuses falls to or below the first threshold, the third information processing apparatuses being the information processing apparatuses belonging to the first group and other than the second information processing apparatuses, and
   move second virtual machines implemented by the second information processing apparatuses to the second group.

4. The management apparatus according to claim 1, wherein
   the processor is configured to
   move second virtual machines implemented in the second group to a third group among the groups, the third group having a second total power consumption value lower than or equal to a second threshold, the second threshold being lower than the first threshold, the third group being different from the second group.

5. The management apparatus according to claim 4, wherein
   the processor is configured to
   move the second virtual machines implemented in the second group to the third group until the total power consumption value of the third group exceeds the second threshold.

6. The management apparatus according to claim 1, wherein
   the processor is configured to
   instruct, when the first virtual machines are unable to be moved to any of the groups, at least one of information processing apparatuses belonging to the first group to execute power capping.

7. The management apparatus according to a claim 1, wherein
   the processor is configured to
   acquire the power consumption value of the respective information processing apparatuses at a predetermined interval, and
   shorten the predetermined interval when the total power consumption value of the first group tends to increase and exceeds the first threshold again.

8. The management apparatus according to claim 7, wherein the processor is configured to
    prolong the predetermined interval when the total power consumption value of the first group is lower than the first threshold.

9. The management apparatus according to claim 1, wherein
    the groups are divided into a primary groups and a secondary groups, the primary groups being used to start implementation of virtual machines, the secondary groups being used to move the virtual machines implemented in the primary groups thereto, and
    the processor is configured to
        select the first group from the primary groups, and
        select the second group from the secondary groups.

10. A method of controlling an information processing system, the method comprising:
    acquiring, by a computer, a power consumption value of respective information processing apparatuses included in the information processing system, the power consumption value being a value of electric power consumed by the respective information processing apparatuses, the information processing apparatuses being divided into groups;
    calculating a total power consumption value of the respective groups, the total power consumption value of a group being a sum of the power consumption values of information processing apparatuses belonging to the group;
    selecting a first group from among the groups, the first group having a first total power consumption value which exceeds a first threshold;
    selecting a first information processing apparatus belonging to the first group, the first information processing apparatus having a largest power consumption value among power consumption values of information processing apparatuses belonging to the first group; and
    moving first virtual machines implemented by the first information processing apparatus to a second group among the groups, the second group being different from the first group.

11. A non-transitory computer-readable recording medium having stored therein a program that causes a computer to execute a process, the process comprising:
    acquiring a power consumption value of respective information processing apparatuses divided into groups, the power consumption value being a value of electric power consumed by the respective information processing apparatuses;
    calculating a total power consumption value of the respective groups, the total power consumption value of a group being a sum of the power consumption values of information processing apparatuses belonging to the group;
    selecting a first group from among the groups, the first group having a first total power consumption value which exceeds a first threshold;
    selecting a first information processing apparatus belonging to the first group, the first information processing apparatus having a largest power consumption value among power consumption values of information processing apparatuses belonging to the first group; and
    moving first virtual machines implemented by the first information processing apparatus to a second group among the groups, the second group being different from the first group.

* * * * *